(12) United States Patent
Lee

(10) Patent No.: US 12,452,449 B2
(45) Date of Patent: *Oct. 21, 2025

(54) VIDEO SIGNAL ENCODING AND DECODING METHOD, AND APPARATUS THEREFOR

(71) Applicant: GUANGDONG OPPO MOBILE TELECOMMUNICATIONS CORP., LTD., Guangdong (CN)

(72) Inventor: Bae Keun Lee, Seongnam-si (KR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/771,147

(22) Filed: Jul. 12, 2024

(65) Prior Publication Data

US 2024/0364917 A1  Oct. 31, 2024

Related U.S. Application Data

(63) Continuation of application No. 18/457,044, filed on Aug. 28, 2023, now Pat. No. 12,108,074, which is a continuation of application No. 17/715,818, filed on Apr. 7, 2022, now Pat. No. 11,812,051, which is a continuation of application No. 17/245,607, filed on
(Continued)

(30) Foreign Application Priority Data

Nov. 8, 2018 (KR) .................. 10-2018-0136261

(51) Int. Cl.
H04N 19/52 (2014.01)
H04N 19/577 (2014.01)

(52) U.S. Cl.
CPC .......... *H04N 19/52* (2014.11); *H04N 19/577* (2014.11)

(58) Field of Classification Search
None
See application file for complete search history.

(56) References Cited

U.S. PATENT DOCUMENTS 11,330,290 B2    5/2022 Lee
2011/0194608 A1  8/2011 Rusert
(Continued)

FOREIGN PATENT DOCUMENTS

CN   104521236 A   4/2015
CN   105264894 A   1/2016
(Continued)

OTHER PUBLICATIONS

First Office Action of the Japanese application No. 2023-198126, issued on Jul. 16, 2024, 10 pages with English translation.
(Continued)

*Primary Examiner* — Lindsay J Uhl
(74) *Attorney, Agent, or Firm* — PERKINS COIE LLP

(57) ABSTRACT

A video decoding method according to the present disclosure includes the steps of: generating a merge candidate list for a current block; determining a merge candidate for the current block among merge candidates included in the merge candidate list; deriving an offset vector for the current block; and deriving a motion vector for the current block by adding the offset vector to a motion vector of the merge candidate.

20 Claims, 14 Drawing Sheets

Related U.S. Application Data

Apr. 30, 2021, now Pat. No. 11,330,290, which is a continuation of application No. PCT/KR2019/015194, filed on Nov. 8, 2019.

(56) References Cited

U.S. PATENT DOCUMENTS

| | | |
|---|---|---|
| 2011/0194609 A1 | 8/2011 | Rusert |
| 2011/0206125 A1 | 8/2011 | Chien |
| 2012/0051431 A1 | 3/2012 | Chien |
| 2013/0114717 A1 | 5/2013 | Zheng |
| 2013/0170549 A1 | 7/2013 | Li |
| 2013/0294513 A1 | 11/2013 | Seregin |
| 2017/0064299 A1 | 3/2017 | Rusert |
| 2017/0099495 A1 | 4/2017 | Rapaka |
| 2018/0048260 A1 | 2/2018 | Ludwig |
| 2018/0084260 A1 | 3/2018 | Chien |
| 2018/0278951 A1 | 9/2018 | Seregin |
| 2019/0200040 A1 | 6/2019 | Lim |
| 2019/0320195 A1 | 10/2019 | Lim |
| 2020/0021814 A1 | 1/2020 | Xu |
| 2020/0099947 A1 | 3/2020 | Li |
| 2020/0107043 A1 | 4/2020 | Hung |
| 2020/0112727 A1 | 4/2020 | Xu |
| 2020/0112733 A1* | 4/2020 | Li ........................ H04N 19/132 |
| 2020/0267408 A1* | 8/2020 | Lee ....................... H04N 19/139 |
| 2021/0044809 A1 | 2/2021 | Abe |
| 2021/0092425 A1 | 3/2021 | Li |
| 2021/0195227 A1 | 6/2021 | Lee |
| 2022/0385931 A1 | 12/2022 | Li |
| 2023/0058060 A1 | 2/2023 | Lim |

FOREIGN PATENT DOCUMENTS

| | | |
|---|---|---|
| CN | 107079161 A | 8/2017 |
| CN | 107079165 A | 8/2017 |
| CN | 109218733 A | 1/2019 |
| CN | 113382234 B | 3/2023 |
| EP | 3547687 A2 | 10/2019 |
| EP | 3860123 B1 | 12/2023 |
| JP | 2013168930 A | 8/2013 |
| KR | 20180007345 A | 1/2018 |
| KR | 20180061060 A | 6/2018 |
| KR | 20180107687 A | 10/2018 |
| RU | 2577779 C2 | 3/2016 |
| RU | 2589347 C2 | 7/2016 |
| RU | 2617920 C9 | 8/2017 |
| WO | 2017076221 A1 | 5/2017 |
| WO | 2018173432 A1 | 9/2018 |
| WO | 2018175911 A1 | 9/2018 |
| WO | 2019013434 A1 | 1/2019 |
| WO | 2020017367 A1 | 1/2020 |

OTHER PUBLICATIONS

Chen, Xu et al. CE 4: Merge Offset Extension(Test 4.4.8). JVET-L0176. Joint Video Experts Team (JVET) of ITU-T SG 16 WP 3 and ISOIEC JTC 1/SC 29/WG 11.12th Meeting: Macao, CN. Oct. 12, 2018, pp. 1-6 See pp. 1-4. 6 pages.

International Search Report in the international application No. PCT/KR2019/015194, mailed on Feb. 21, 2020. 5 pages with English translation.

First Office Action of the Mexican application No. MX/a/2021/005149, issued on May 28, 2024, 6 pages with English translation.

First Office Action of the Australian application No. 2019376595, issued on Jun. 6, 2024, 4 pages.

First Office Action of the Mexican application No. MX/a/2021/004886, issued on May 8, 2024, 8 pages with English translation.

First Office Action of the Vietnamese application No. 1-2021-03045, issued on May 30, 2024, 3 pages with English translation.

Notice of Allowance of the U.S. Appl. No. 18/457,044, issued on Apr. 10, 2024, 61 pages.

Notice of Allowance of the U.S. Appl. No. 18/457,044, issued on May 3, 2024, 6 pages.

Supplemental Notice of Allowance of the U.S. Appl. No. 17/715,818, issued on Aug. 31, 2023, 6 pages.

Correction Notice of Allowance of the U.S. Appl. No. 17/715,818, issued on Oct. 4, 2023, 6 pages.

Third Office Action of the European application No. 19883073.9, issued on Apr. 11, 2023. 4 pages.

First Office Action of the Russian application No. 2021115538, issued on May 2, 2023. 13 pages with English translation.

Written Opinion of the International Search Authority in the international application No. PCT/KR2019/015194, mailed on Feb. 21, 2020. 8 pages with English translation.

Xu Chen et al: "CE4: Enhanced Merge Mode (Test 4.2.15)", Joint Video Experts Team (JVET) of ITU-T SG 16 WP 3 And ISO/IEC JTC 1 /SC 29/WG 11 11 TH Meeting, No. JVET-K0198 Jul. 18, 2018 (Jul. 18, 2018), pp. 1-8, XP030199235. 8 pages.

Li (Tencent) Get AL: "CE4-related: affine merge mode with prediction offsets", 12. JVET Meeting; Oct. 3, 2018-Oct. 12, 2018; Macao; (The Joint Video Exploration Team of ISO/IEC JTC1/SC29/WG11 and ITU-T SG. 16), No. JVET-L0320 Oct. 7, 2018 (Oct. 7, 2018), XP030195210, the whole document. 6 pages.

Yang (Huawei) H et al: "CE4: Summary report on inter prediction and motion vector coding", 12. JVET Meeting; Oct. 3, 2018-Oct. 12, 2018; Macao; (The Joint Video Exploration Team of ISO/IEC JTC1/SC29/WG11 and ITU-T SG. 16), No. JVET-L0024 Oct. 4, 2018 (Oct. 4, 2018), XP030194589, the whole document, 48 pages.

Oudin S et al: "Block merging for quadtree-based video coding", Multimedia and Expo (ICME), 2011 IEEE International Conference on. IEEE Jul. 1, 2011 (Jul. 11, 2011), pp. 1-6, XP031964689. 6 pages.

An (Hisilicon) J et al: "Enhanced Merge Mode based on JEM7.0", 10. JVET Meeting: Apr. 10, 2018-Apr. 20, 2018; San Diego; (The Joint Video Exploration Team of ISO/IEC JTC1/SC29/WG11 and ITU-T SG.16), No. JVET-J0059 Apr. 15, 2018 (Apr. 15, 2018), XP030248269, the whole document, 14 pages.

Supplementary European Search Report in the European application No. 19883073.9, mailed on Oct. 7, 2021. 9 pages.

International Search Report in the international application No. PCT/KR2019/015198, mailed on Feb. 14, 2020. 5 pages with English translation.

Written Opinion of the International Search Authority in the international application No. PCT/KR2019/015198, mailed on Feb. 14, 2020. 8 pages with English translation.

Supplementary European Search Report in the European application No. 19883103.4, mailed on Oct. 6, 2021. 10 pages.

U.S. Appl. No. 62/698,009, Inventor: Xu, Xiaozhong, Li, Xiang, Liu, Shan, Date of Publication: Jan. 16, 2020, Title: Techniques for Simplified Affine Motion Compensation With Prediction Offsets. the whole document. 22 pages.

First Office Action of the U.S. Appl. No. 17/232,476, issued on Jun. 24, 2021. 23 pages.

First Office Action of the Israeli application No. 282787, issued on Jul. 27, 2023, 5 pages.

Second Office Action of the Russian application No. 2021115538, issued on Sep. 4, 2023, 8 pages with English translation.

First Office Action of the Chinese application No. 202110872234.5, issued on Nov. 2, 2022. 19 pages with English translation.

Notice of Allowance of the U.S. Appl. No. 17/715,779, issued on Nov. 30, 2022. 26 pages.

Second Office Action of the European application No. 19883073.9, issued on Oct. 27, 2022. 5 pages.

Supplementary Notice of Allowance of the U.S. Appl. No. 17/715,779, issued on Jan. 5, 2023. 6 pages.

First Office Action of the Indonesian application No. P00202104258, issued on Jun. 20, 2023. 3 pages with English translation.

First Office Action of the U.S. Appl. No. 17/715,818, issued on Dec. 7, 2022. 40 pages.

Notice of Allowance of the U.S. Appl. No. 17/715,818, issued on Jun. 2, 2023. 13 pages.

Supplemental Notice of Allowance of the U.S. Appl. No. 17/715,818, issued on Jul. 27, 2023. 6 pages.

(56) References Cited

OTHER PUBLICATIONS

Tomonori Hashimoto, Eiichi Sasaki, and Tomohiro Ikai, "Non-CE4: Enhanced ultimate motion vector expression", Joint Video Exploration Team (JVET) of ITU-T SG 16 WP 3 and ISO/IEC JTC 1/SC 29/WG 11, JVET-L0355, 12th Meeting: Macau, CH, Oct. 2, 2018. p. 1-5. 5 pages.
Li Jingya, Ru-Ling Liao, and Chong Soon Lim, "CE4-related: Improvement on ultimate motion vector expression", Joint Video Exploration Team (JVET) of ITU-T SG 16 WP 3 and ISO/IEC JTC 1/SC 29/WG 11, JVET-L0408-v2, 12th Meeting: Macao, CN, Oct. 3-12, 2018. p. 1-4. 4 pages.
Kai Zhang et al, "Non-CE4: Harmonization of MMVD and AMVR", Joint Video Experts Team (JVET) of ITU-T SG 16 WP 3 and ISO/IEC JTC 1/SC 29/WG 11, JVET-M0267-v2, 13th Meeting: Marrakech, MA, Jan. 9-18, 2019. p. 1-2. 2 pages.
First Office Action of the Japanese application No. 2021-522451, issued on Aug. 8, 2023. 8 pages with English translation.
First Office Action of the European application No. 19883103.4, issued on Mar. 29, 2022. 7 pages.
Second Office Action of the European application No. 19883103.4, issued on Oct. 27, 2022. 5 pages.
Third Office Action of the European application No. 19883103.4, issued on Feb. 23, 2023. 4 pages.
First Office Action of the Chinese application No. 202110644629.X, issued on Aug. 26, 2022. 18 pages with English translation.
Notice of Allowance of the Chinese application No. 202110644629. X, issued on Dec. 26, 2022. 5 pages with English translation.
Final Office Action of the U.S. Appl. No. 17/232,476, issued on Oct. 20, 2021. 23 pages.
Advisory Action of the U.S. Appl. No. 17/232,476, issued on Jan. 12, 2022. 8 pages.
Advisory Action of the U.S. Appl. No. 17/232,476, issued on Feb. 18, 2022. 6 pages.
First Office Action after RCE of the U.S. Appl. No. 17/232,476, issued on Apr. 8, 2022. 16 pages.
Final Office Action after RCE of the U.S. Appl. No. 17/232,476, issued on Jul. 22, 2022. 25 pages.
Advisory Action of the U.S. Appl. No. 17/232,476, issued on Nov. 4, 2022. 6 pages.
First Office Action after RCE of the U.S. Appl. No. 17/232,476, issued on Jan. 20, 2023. 47 pages.
Final Office Action after RCE of the U.S. Appl. No. 17/232,476, issued on May 25, 2023. 49 pages.
First Office Action of the Canadian application No. 3117479, issued on May 11, 2022. 6 pages.
First Office Action of the Chilean application No. 202101126, issued on Jun. 13, 2022. 24 pages with English translation.
First Office Action of the Indonesian application No. P00202103421, issued on May 17, 2023. 6 pages with English translation.
First Office Action of the Israeli application No. 282664, issued on Aug. 8, 2023. 6 pages.
Office Action of the Indian application No. 202117021379, issued on Feb. 23, 2022. 6 pages with English translation.
First Office Action of the Russian application No. 2021116390, issued on Mar. 29, 2023. 24 pages with English translation.
First Office Action of the Japanese application No. 2021-523795, issued on Aug. 8, 2023. 8 pages with English translation.
Jeong S et al: "CE4 Ultimate motion vector expression (Test 4.5.4)", The Joint Video Exploration Team of ISO/IEC JTC1/SC29/WG11 and ITU-T SG.16, No. JVET-L0054 Oct. 12, 2018 (Oct. 12, 2018), pp. 1-8, XP030194606. 8 pages.
Alshin A et al: "Description of SDR, HDR and 360° video coding technology proposal by Samsung, Huawei, GoPro, and HiSilicon-mobile application scenario", 10. JVET Meeting; Apr. 10, 2018-Apr. 20, 2018; San Diego; (The Joint Video Exploration Team of ISO/IEC JTC1/SC29/WG11 and ITU-T SG. 16), No. JVET-J0024 Apr. 14, 2018 (Apr. 14, 2018), p. 54 (3.1.4.3), XP030248219. 124 pages.
First Office Action of the European application No. 19883073.9, issued on Mar. 29, 2022. 7 pages.
Office Action of the Indian application No. 202117022042, issued on Feb. 24, 2022. 6 pages.
First Office Action of the U.S. Appl. No. 17/245,607, issued on Aug. 23, 2021. 25 pages.
Notice of Allowance of the U.S. Appl. No. 17/245,607, issued on Jan. 10, 2022. 14 pages.
First Office Action of the Chilean application No. 202101135, issued on Jul. 20, 2022. 17 pages with English translation.
First Office Action of the Canadian application No. 3118882, issued on May 24, 2022. 5 pages.
First Office Action of the Australian application No. 2019374663, issued on Aug. 5, 2022. 3 pages.
First Office Action of the Korean application No. 10-2019-0142815, issued on Mar. 2, 2025, 12 pages with English translation.
First Office Action of the Korean application No. 10-2019-0142816, issued on Mar. 28, 2025, 11 pages with English translation.
First Office Action of the Chinese application No. 202310109479.1, issued on May 20, 2025, 13 pages with English translation.
First Office Action of the Malaysian application No. PI2021002376, issued on Feb. 3, 2024, 3 pages.
Hearing Notice of the Indian application No. 202117021379, issued on Feb. 6, 2024, 2 pages with English translation.
First Office Action of the Malaysian application No. PI2021002415, issued on Feb. 29, 2024, 4 pages.
Supplementary European Search Report in the European application No. 24151295.3, mailed on Apr. 19, 2024, 12 pages.

\* cited by examiner

VIDEO SIGNAL ENCODING AND DECODING METHOD, AND APPARATUS THEREFOR

REFERENCE TO RELATED APPLICATIONS

This application is a continuation of U.S. application Ser. No. 18/457,044 filed on Aug. 28, 2023, which a continuation of U.S. application Ser. No. 17/715,818 filed on Apr. 7, 2022, which is a continuation of U.S. application Ser. No. 17/245,607 filed on Apr. 30, 2021. The U.S. application Ser. No. 17/245,607 is a continuation of International Patent Application No. PCT/KR2019/015194 filed on Nov. 8, 2019 and claiming priority to Korean Patent Application No. 10-2018-0136261 filed on Nov. 8, 2018, the disclosures of which are incorporated herein by reference in their entirety.

FIELD OF THE DISCLOSURE

The present disclosure relates to a video signal encoding and decoding method and an apparatus therefor.

BACKGROUND

As display panels are getting bigger and bigger, video services of further higher quality are required more and more. The biggest problem of high-definition video services is significant increase in data volume, and to solve this problem, studies for improving the video compression rate are actively conducted. As a representative example, the Motion Picture Experts Group (MPEG) and the Video Coding Experts Group (VCEG) under the International Telecommunication Union-Telecommunication (ITU-T) have formed the Joint Collaborative Team on Video Coding (JCT-VC) in 2009. The JCT-VC has proposed High Efficiency Video Coding (HEVC), which is a video compression standard having a compression performance about twice as high as the compression performance of H.264/AVC, and it is approved as a standard on Jan. 25, 2013. With rapid advancement in the high-definition video services, performance of the HEVC gradually reveals its limitations.

SUMMARY OF THE DISCLOSURE

An object of the present disclosure is to provide a method of refining a motion vector derived from a merge candidate based on an offset vector in encoding/decoding a video signal, and an apparatus for performing the method.

Another object of the present disclosure is to provide a signaling method of an offset vector in encoding/decoding a video signal, and an apparatus for performing the method.

The technical problems to be achieved in the present disclosure are not limited to the technical problems mentioned above, and unmentioned other problems may be clearly understood by those skilled in the art from the following description.

A method of decoding/encoding a video signal according to the present disclosure includes the steps of: generating a merge candidate list for a current block; determining a merge candidate for the current block among merge candidates included in the merge candidate list; deriving an offset vector for the current block; and deriving a motion vector for the current block by adding the offset vector to a motion vector of the merge candidate.

In the video signal encoding and decoding method according to the present disclosure, the magnitude of the offset vector may be determined based on first index information specifying one among motion magnitude candidates.

In the video signal encoding and decoding method according to the present disclosure, at least one among a maximum numerical value and a minimum numerical value of the motion magnitude candidates may be set differently according to a numerical value of a flag indicating a numerical range of the motion magnitude candidates.

In the video signal encoding and decoding method according to the present disclosure, the flag may be signalled through a picture parameter set.

In the video signal encoding and decoding method according to the present disclosure, at least one among a maximum numerical value and a minimum numerical value of the motion magnitude candidates may be set differently according to motion vector precision for the current block.

In the video signal encoding and decoding method according to the present disclosure, the magnitude of the offset vector may be obtained by applying a shift operation to a value indicated by the motion magnitude candidate specified by the first index information.

In the video signal encoding and decoding method according to the present disclosure, a direction of the offset vector may be determined based on second index information specifying one among vector direction candidates.

Features briefly summarized above with respect to the present disclosure are merely exemplary aspects of the detailed description of the present disclosure that will be described below, and do not limit the scope of the present disclosure.

According to the present disclosure, inter prediction efficiency can be improved by refining a motion vector of a merge candidate based on an offset vector.

According to the present disclosure, inter prediction efficiency can be improved by adaptively determining a magnitude and a direction of an offset vector.

The effects that can be obtained from the present disclosure are not limited to the effects mentioned above, and unmentioned other effects may be clearly understood by those skilled in the art from the following description.

DETAILED DESCRIPTION OF THE PREFERRED EMBODIMENT

Hereafter, an embodiment of the present disclosure will be described in detail with reference to the accompanying drawings.

Encoding and decoding of a video is performed by the unit of block. For example, an encoding/decoding process such as transform, quantization, prediction, in-loop filtering, reconstruction or the like may be performed on a coding block, a transform block, or a prediction block.

Hereinafter, a block to be encoded/decoded will be referred to as a 'current block'. For example, the current block may represent a coding block, a transform block or a prediction block according to a current encoding/decoding process step.

In addition, it may be understood that the term 'unit' used in this specification indicates a basic unit for performing a specific encoding/decoding process, and the term 'block' indicates a sample array of a predetermined size. Unless otherwise stated, the 'block' and 'unit' may be used to have the same meaning. For example, in an embodiment described below, it may be understood that a coding block and a coding unit have the same meaning.

Figure 1:
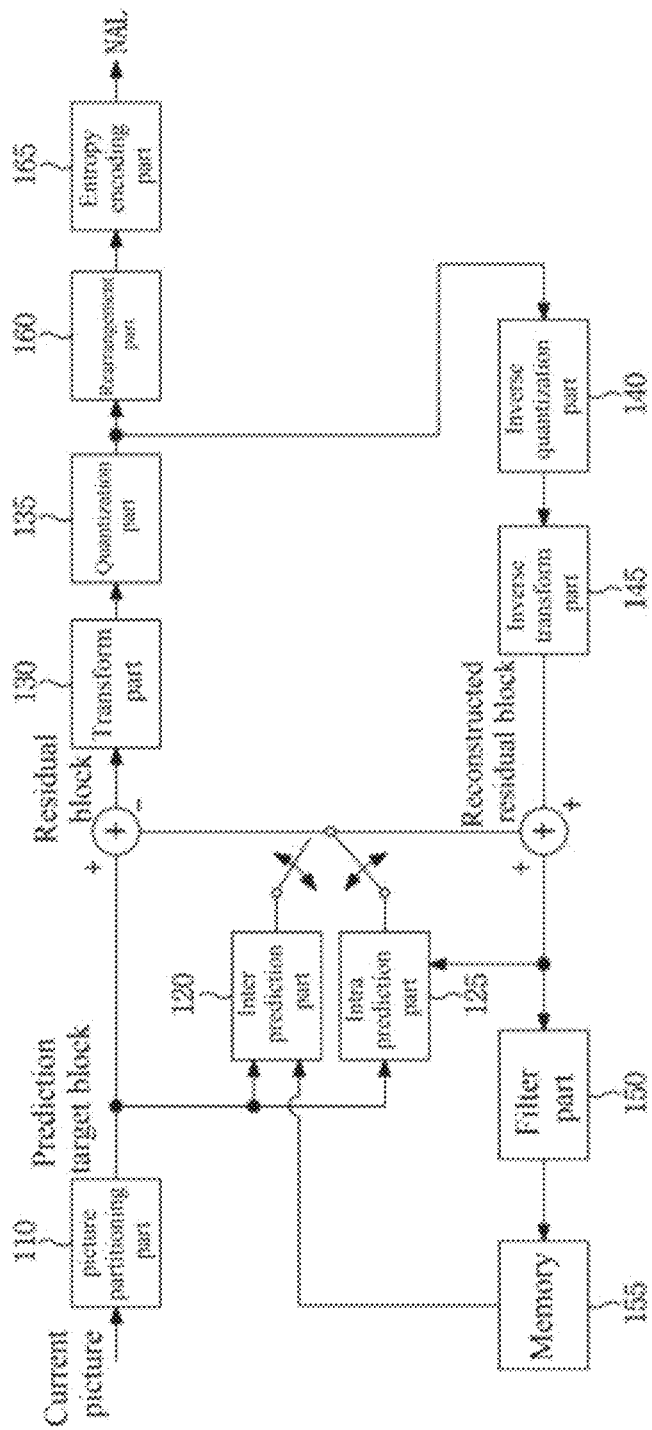
FIG. 1 is a block diagram showing a video encoder according to an embodiment of the present disclosure.

FIG. 1 is a block diagram showing a video encoder according to an embodiment of the present disclosure.

Referring to FIG. 1, a video encoding apparatus 100 may include a picture partitioning part 110, a prediction part 120 and 125, a transform part 130, a quantization part 135, a rearrangement part 160, an entropy coding part 165, an inverse quantization part 140, an inverse transform part 145, a filter part 150, and a memory 155.

Each of the components shown in FIG. 1 is independently shown to represent characteristic functions different from each other in a video encoding apparatus, and it does not mean that each component is formed by the configuration unit of separate hardware or single software. That is, each component is included to be listed as a component for convenience of explanation, and at least two of the components may be combined to form a single component, or one component may be divided into a plurality of components to perform a function. Integrated embodiments and separate embodiments of the components are also included in the scope of the present disclosure if they do not depart from the essence of the present disclosure.

In addition, some of the components are not essential components that perform essential functions in the present disclosure, but may be optional components only for improving performance. The present disclosure can be implemented by including only components essential to implement the essence of the present disclosure excluding components used for improving performance, and a structure including only the essential components excluding the optional components used for improving performance is also included in the scope of the present disclosure.

The picture partitioning part 110 may partition an input picture into at least one processing unit. At this point, the processing unit may be a prediction unit (PU), a transform unit (TU), or a coding unit (CU). The picture partitioning part 110 may partition a picture into a combination of a plurality of coding units, prediction units, and transform units, and encode a picture by selecting a combination of a coding unit, a prediction unit, and a transform unit based on a predetermined criterion (e.g., a cost function).

For example, one picture may be partitioned into a plurality of coding units. In order to partition the coding units in a picture, a recursive tree structure such as a quad tree structure may be used. A video or a coding unit partitioned into different coding units using the largest coding unit as a root may be partitioned to have as many child nodes as the number of partitioned coding units. A coding unit that is not partitioned any more according to a predetermined restriction become a leaf node. That is, when it is assumed that only square partitioning is possible for one coding unit, the one coding unit may be partitioned into up to four different coding units.

Hereinafter, in an embodiment of the present disclosure, the coding unit may be used as a meaning of a unit performing encoding or a meaning of a unit performing decoding.

The prediction unit may be one that is partitioned in a shape of at least one square, rectangle or the like of the same size within one coding unit, or it may be any one prediction unit, among the prediction units partitioned within one coding unit, that is partitioned to have a shape and/or size different from those of another prediction unit.

If the coding unit is not a smallest coding unit when a prediction unit that performs intra prediction based on the coding unit is generated, intra prediction may be performed without partitioning a picture into a plurality of prediction units N×N.

The prediction part 120 and 125 may include an inter prediction part 120 that performs inter prediction and an intra prediction part 125 that performs intra prediction. It may be determined whether to use inter prediction or to perform intra prediction for a prediction unit, and determine specific information (e.g., intra prediction mode, motion vector, reference picture, etc.) according to each prediction method. At this point, a processing unit for performing prediction may be different from a processing unit for determining a prediction method and specific content. For example, a prediction method and a prediction mode may be determined in a prediction unit, and prediction may be performed in a transform unit. A residual coefficient (residual block) between the reconstructed prediction block and the original block may be input into the transform part 130. In addition, prediction mode information, motion vector information and the like used for prediction may be encoded by the entropy coding part 165 together with the residual coefficient and transferred to a decoder. When a specific encoding mode is used, an original block may be encoded as it is and transmitted to a decoder without generating a prediction block through the prediction part 120 and 125.

The inter prediction part 120 may predict a prediction unit based on information on at least one picture among pictures before or after the current picture, and in some cases, it may predict a prediction unit based on information on a partial area that has been encoded in the current picture. The inter prediction part 120 may include a reference picture interpolation part, a motion prediction part, and a motion compensation part.

The reference picture interpolation part may receive reference picture information from the memory 155 and generate pixel information of an integer number of pixels or less from the reference picture. In the case of a luminance pixel, a DCT-based 8-tap interpolation filter with a varying filter coefficient may be used to generate pixel information of an integer number of pixels or less by the unit of ¼ pixels. In the case of a color difference signal, a DCT-based 4-tap interpolation filter with a varying filter coefficient may be used to generate pixel information of an integer number of pixels or less by the unit of ⅛ pixels.

The motion prediction part may perform motion prediction based on the reference picture interpolated by the reference picture interpolation part. Various methods such as a full search-based block matching algorithm (FBMA), a three-step search (TSS), and a new three-step search algorithm (NTS) may be used as a method of calculating a motion vector. The motion vector may have a motion vector value of a unit of ½ or ¼ pixels based on interpolated pixels. The motion prediction part may predict a current prediction unit by varying the motion prediction mode. Various methods such as a skip mode, a merge mode, an advanced motion vector prediction (AMVP) mode, an intra-block copy mode and the like may be used as the motion prediction mode.

The intra prediction part 125 may generate a prediction unit based on the information on reference pixels in the neighborhood of the current block, which is pixel information in the current picture. When a block in the neighborhood of the current prediction unit is a block on which inter prediction has been performed and thus the reference pixel is a pixel on which inter prediction has been performed, the reference pixel included in the block on which inter prediction has been performed may be used in place of reference pixel information of a block in the neighborhood on which intra prediction has been performed. That is, when a reference pixel is unavailable, at least one reference pixel among available reference pixels may be used in place of unavailable reference pixel information.

In the intra prediction, the prediction mode may have an angular prediction mode that uses reference pixel information according to a prediction direction, and a non-angular prediction mode that does not use directional information when performing prediction. A mode for predicting luminance information may be different from a mode for predicting color difference information, and intra prediction mode information used to predict luminance information or predicted luminance signal information may be used to predict the color difference information.

If the size of the prediction unit is the same as the size of the transform unit when intra prediction is performed, the intra prediction may be performed for the prediction unit based on a pixel on the left side, a pixel on the top-left side, and a pixel on the top of the prediction unit. However, if the size of the prediction unit is different from the size of the transform unit when the intra prediction is performed, the intra prediction may be performed using a reference pixel based on the transform unit. In addition, intra prediction using N×N partitioning may be used only for the smallest coding unit.

The intra prediction method may generate a prediction block after applying an Adaptive Intra Smoothing (AIS) filter to the reference pixel according to a prediction mode. The type of the AIS filter applied to the reference pixel may vary. In order to perform the intra prediction method, the intra prediction mode of the current prediction unit may be predicted from the intra prediction mode of the prediction unit existing in the neighborhood of the current prediction unit. When a prediction mode of the current prediction unit is predicted using the mode information predicted from the neighboring prediction unit, if the intra prediction modes of the current prediction unit is the same as the prediction unit in the neighborhood, information indicating that the prediction modes of the current prediction unit is the same as the prediction unit in the neighborhood may be transmitted using predetermined flag information, and if the prediction modes of the current prediction unit and the prediction unit in the neighborhood are different from each other, prediction mode information of the current block may be encoded by performing entropy coding.

In addition, a residual block including a prediction unit that has performed prediction based on the prediction unit generated by the prediction part 120 and 125 and residual coefficient information, which is a difference value of the prediction unit with the original block, may be generated. The generated residual block may be input into the transform part 130.

The transform part 130 may transform the residual block including the original block and the residual coefficient information of the prediction unit generated through the prediction part 120 and 125 using a transform method such as Discrete Cosine Transform (DCT) or Discrete Sine Transform (DST). Here, the DCT transform core includes at least one among DCT2 and DCT8, and the DST transform core includes DST7. Whether or not to apply DCT or DST to transform the residual block may be determined based on intra prediction mode information of a prediction unit used to generate the residual block. The transform on the residual block may be skipped. A flag indicating whether or not to skip the transform on the residual block may be encoded. The transform skip may be allowed for a residual block having a size smaller than or equal to a threshold, a luma component, or a chroma component under the 4:4:4 format.

The quantization part 135 may quantize values transformed into the frequency domain by the transform part 130. Quantization coefficients may vary according to the block or the importance of a video. A value calculated by the quantization part 135 may be provided to the inverse quantization part 140 and the rearrangement part 160.

The rearrangement part 160 may rearrange coefficient values for the quantized residual coefficients.

The rearrangement part 160 may change coefficients of a two-dimensional block shape into a one-dimensional vector shape through a coefficient scanning method. For example, the rearrangement part 160 may scan DC coefficients up to high-frequency domain coefficients using a zig-zag scan method, and change the coefficients into a one-dimensional vector shape. According to the size of the transform unit and the intra prediction mode, a vertical scan of scanning the coefficients of a two-dimensional block shape in the column direction and a horizontal scan of scanning the coefficients of a two-dimensional block shape in the row direction may be used instead of the zig-zag scan. That is, according to the size of the transform unit and the intra prediction mode, a scan method that will be used may be determined among the zig-zag scan, the vertical direction scan, and the horizontal direction scan.

The entropy coding part 165 may perform entropy coding based on values calculated by the rearrangement part 160. Entropy coding may use various encoding methods such as Exponential Golomb, Context-Adaptive Variable Length Coding (CAVLC), Context-Adaptive Binary Arithmetic Coding (CABAC), and the like.

The entropy coding part 165 may encode various information such as residual coefficient information and block type information of a coding unit, prediction mode information, partitioning unit information, prediction unit information and transmission unit information, motion vector information, reference frame information, block interpolation information, and filtering information input from the rearrangement part 160 and the prediction parts 120 and 125.

The entropy coding part 165 may entropy-encode the coefficient value of a coding unit input from the rearrangement part 160.

The inverse quantization part 140 and the inverse transform part 145 inverse-quantize the values quantized by the quantization part 135 and inverse-transform the values transformed by the transform part 130. The residual coefficient generated by the inverse quantization part 140 and the inverse transform part 145 may be combined with the prediction unit predicted through a motion estimation part, a motion compensation part, and an intra prediction part included in the prediction part 120 and 125 to generate a reconstructed block.

The filter part 150 may include at least one among a deblocking filter, an offset correction unit, and an adaptive loop filter (ALF).

The deblocking filter may remove block distortion generated by the boundary between blocks in the reconstructed picture. In order to determine whether or not to perform deblocking, whether or not to apply the deblocking filter to the current block may be determined based on the pixels included in several columns or rows included in the block. A strong filter or a weak filter may be applied according to the deblocking filtering strength needed when the deblocking filter is applied to a block. In addition, when vertical direction filtering and horizontal direction filtering are performed in applying the deblocking filter, horizontal direction filtering and vertical direction filtering may be processed in parallel.

The offset correction unit may correct an offset to the original video by the unit of pixel for a video on which the deblocking has been performed. In order to perform offset correction for a specific picture, it is possible to use a method of dividing pixels included in the video into a certain number of areas, determining an area to perform offset, and applying the offset to the area, or a method of applying an offset considering edge information of each pixel.

Adaptive Loop Filtering (ALF) may be performed based on a value obtained by comparing the reconstructed and filtered video with the original video. After dividing the pixels included in the video into predetermined groups, one filter to be applied to a corresponding group may be determined, and filtering may be performed differently for each group. A luminance signal, which is the information related to whether or not to apply ALF, may be transmitted for each coding unit (CU), and the shape and filter coefficient of an ALF filter to be applied may vary according to each block. In addition, an ALF filter of the same type (fixed type) may be applied regardless of the characteristic of a block to be applied.

The memory 155 may store the reconstructed block or picture calculated through the filter part 150, and the reconstructed and stored block or picture may be provided to the prediction part 120 and 125 when inter prediction is performed.

Figure 2:
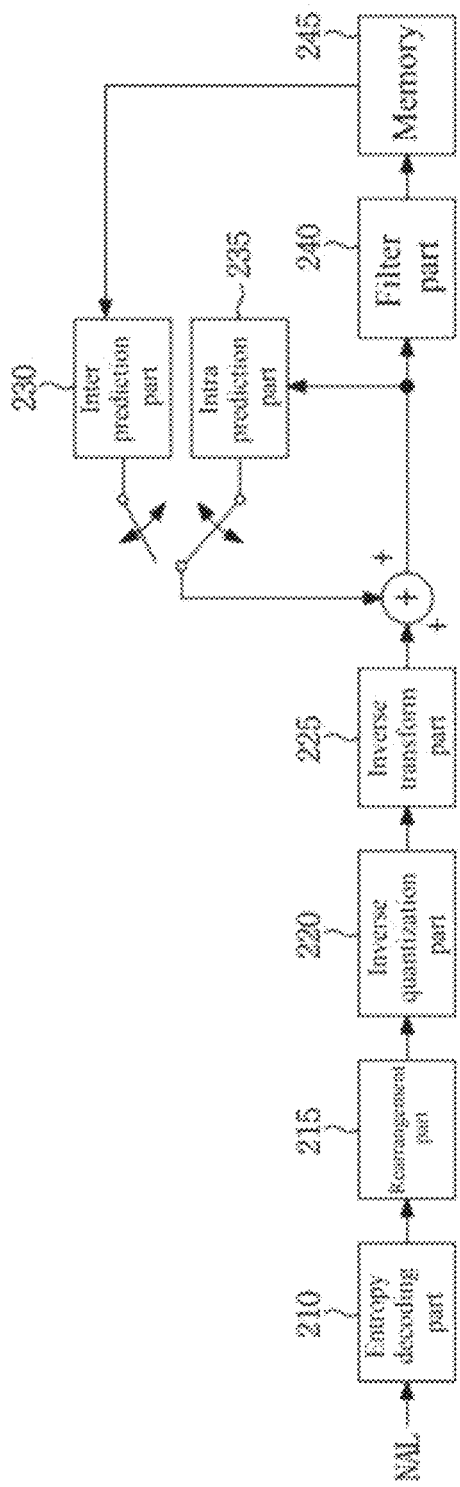
FIG. 2 is a block diagram showing a video decoder according to an embodiment of the present disclosure.

FIG. 2 is a block diagram showing a video decoder according to an embodiment of the present disclosure.

Referring to FIG. 2, a video decoder 200 may include an entropy decoding part 210, a rearrangement part 215, an inverse quantization part 220, an inverse transform part 225, a prediction part 230 and 235, a filter part 240, and a memory 245.

When a video bitstream is input from a video encoder, the input bitstream may be decoded in a procedure opposite to that of the video encoder.

The entropy decoding part 210 may perform entropy decoding in a procedure opposite to that of performing entropy coding in the entropy decoding part of the video encoder. For example, various methods corresponding to the method performed by the video encoder, such as Exponential Golomb, Context-Adaptive Variable Length Coding (CAVLC), and Context-Adaptive Binary Arithmetic Coding (CABAC), may be applied.

The entropy decoding part 210 may decode information related to intra prediction and inter prediction performed by the encoder.

The rearrangement part 215 may perform rearrangement on the bitstream entropy-decoded by the entropy decoding part 210 based on the rearrangement method performed by the encoder. The coefficients expressed in a one-dimensional vector shape may be reconstructed and rearranged as coefficients of two-dimensional block shape. The rearrangement part 215 may receive information related to coefficient scanning performed by the encoding part and perform reconstruction through a method of inverse-scanning based on the scanning order performed by the corresponding encoding part.

The inverse quantization part 220 may perform inverse quantization based on a quantization parameter provided by the encoder and a coefficient value of the rearranged block.

The inverse transform part 225 may perform inverse transform on the transform, i.e., DCT or DST, performed by the transform part on a result of the quantization performed by the video encoder, i.e., inverse DCT or inverse DST. Here, the DCT transform core may include at least one among DCT2 and DCT8, and the DST transform core may include DST7. Alternatively, when the transform is skipped in the video encoder, even the inverse transform part 225 may not perform the inverse transform. The inverse transform may be performed based on a transmission unit determined by the video encoder. The inverse transform part 225 of the video decoder may selectively perform a transform technique (e.g., DCT or DST) according to a plurality of pieces of information such as a prediction method, a size of a current block, a prediction direction and the like.

The prediction part 230 and 235 may generate a prediction block based on information related to generation of a prediction block provided by the entropy decoder 210 and information on a previously decoded block or picture provided by the memory 245.

As described above, if the size of the prediction unit and the size of the transform unit are the same when intra prediction is performed in the same manner as the operation of the video encoder, intra prediction is performed on the prediction unit based on the pixel existing on the left side, the pixel on the top-left side, and the pixel on the top of the prediction unit. However, if the size of the prediction unit and the size of the transform unit are different when intra prediction is performed, intra prediction may be performed using a reference pixel based on a transform unit. In addition, intra prediction using N×N partitioning may be used only for the smallest coding unit.

The prediction part 230 and 235 may include a prediction unit determination part, an inter prediction part, and an intra prediction part. The prediction unit determination part may receive various information such as prediction unit information input from the entropy decoding part 210, prediction mode information of the intra prediction method, information related to motion prediction of an inter prediction method, and the like, identify the prediction unit from the current coding unit, and determine whether the prediction unit performs inter prediction or intra prediction. The inter prediction part 230 may perform inter prediction on the current prediction unit based on information included in at least one picture among pictures before or after the current picture including the current prediction unit by using information necessary for inter prediction of the current prediction unit provided by the video encoder. Alternatively, the inter prediction part 230 may perform inter prediction based on information on a partial area previously reconstructed in the current picture including the current prediction unit.

In order to perform inter prediction, it may be determined, based on the coding unit, whether the motion prediction method of the prediction unit included in a corresponding coding unit is a skip mode, a merge mode, a motion vector prediction mode (AMVP mode), or an intra-block copy mode.

The intra prediction part 235 may generate a prediction block based on the information on the pixel in the current picture. When the prediction unit is a prediction unit that has performed intra prediction, the intra prediction may be performed based on intra prediction mode information of the prediction unit provided by the video encoder. The intra prediction part 235 may include an Adaptive Intra Smoothing (AIS) filter, a reference pixel interpolation part, and a DC filter. The AIS filter is a part that performs filtering on the reference pixel of the current block, and may determine whether or not to apply the filter according to the prediction mode of the current prediction unit and apply the filter. AIS filtering may be performed on the reference pixel of the current block by using the prediction mode and AIS filter information of the prediction unit provided by the video encoder. When the prediction mode of the current block is a mode that does not perform AIS filtering, the AIS filter may not be applied.

When the prediction mode of the prediction unit is a prediction unit that performs intra prediction based on a pixel value obtained by interpolating the reference pixel, the reference pixel interpolation part may generate a reference pixel of a pixel unit having an integer value or less by interpolating the reference pixel. When the prediction mode of the current prediction unit is a prediction mode that generates a prediction block without interpolating the reference pixel, the reference pixel may not be interpolated. The DC filter may generate a prediction block through filtering when the prediction mode of the current block is the DC mode.

The reconstructed block or picture may be provided to the filter part 240. The filter part 240 may include a deblocking filter, an offset correction unit, and an ALF.

Information on whether a deblocking filter is applied to a corresponding block or picture and information on whether a strong filter or a weak filter is applied when a deblocking filter is applied may be provided by the video encoder. The deblocking filter of the video decoder may be provided with information related to the deblocking filter provided by the video encoder, and the video decoder may perform deblocking filtering on a corresponding block.

The offset correction unit may perform offset correction on the reconstructed video based on the offset correction type and offset value information applied to the video when encoding is performed.

The ALF may be applied to a coding unit based on information on whether or not to apply the ALF and information on ALF coefficients provided by the encoder. The ALF information may be provided to be included in a specific parameter set.

The memory 245 may store the reconstructed picture or block and use it as a reference picture or a reference block and may provide the reconstructed picture to an output unit.

Figure 3:
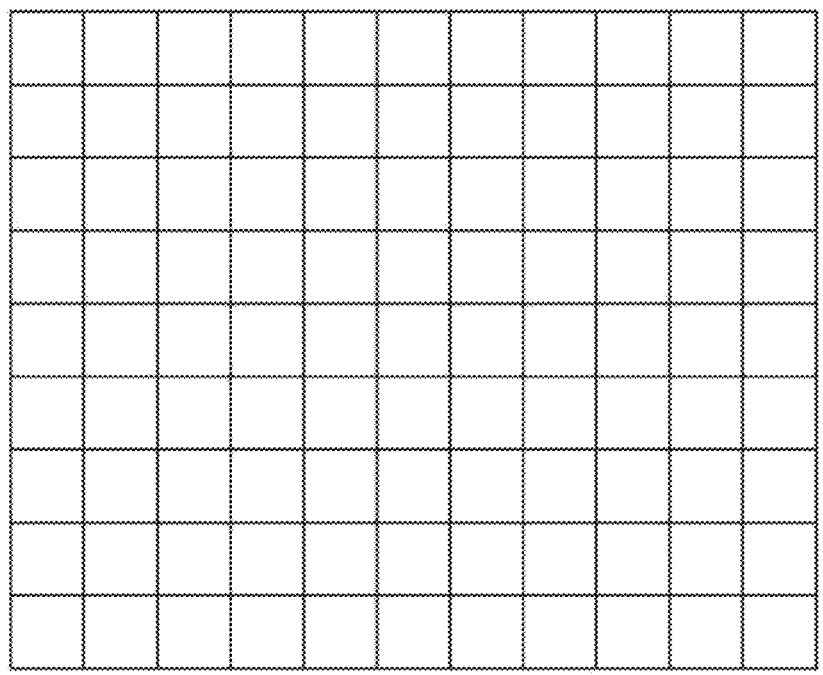
FIG. 3 is a view showing a basic coding tree unit according to an embodiment of the present disclosure.

FIG. 3 is a view showing a basic coding tree unit according to an embodiment of the present disclosure.

A coding block of a maximum size may be defined as a coding tree block. A picture is partitioned into a plurality of coding tree units (CTUs). The coding tree unit is a coding unit having a maximum size and may be referred to as a Large Coding Unit (LCU). FIG. 3 shows an example in which a picture is partitioned into a plurality of coding tree units.

The size of the coding tree unit may be defined at a picture level or a sequence level. To this end, information indicating the size of the coding tree unit may be signalled through a picture parameter set or a sequence parameter set.

For example, the size of the coding tree unit for the entire picture in a sequence may be set to 128×128. Alternatively, at the picture level, any one among 128×128 and 256×256 may be determined as the size of the coding tree unit. For example, the size of the coding tree unit may be set to 128×128 in a first picture, and the size of the coding tree unit may be set to 256×256 in a second picture.

Coding blocks may be generated by partitioning a coding tree unit. The coding block indicates a basic unit for performing encoding/decoding. For example, prediction or transform may be performed for each coding block, or a prediction encoding mode may be determined for each coding block. Here, the prediction encoding mode indicates a method of generating a prediction picture. For example, the prediction encoding mode may include prediction within a picture (intra prediction), prediction between pictures (inter prediction), current picture referencing (CPR) or intra-block copy (IBC), or combined prediction. For the coding block, a prediction block may be generated by using at least one prediction encoding mode among the intra prediction, the inter prediction, the current picture referencing, and the combined prediction.

Information indicating the prediction encoding mode of the current block may be signalled through a bitstream. For example, the information may be a 1-bit flag indicating whether the prediction encoding mode is an intra mode or an inter mode. Only when the prediction encoding mode of the current block is determined as the inter mode, the current picture referencing or the combined prediction may be used.

The current picture reference is for setting the current picture as a reference picture and obtaining a prediction block of the current block from an area that has already been encoded/decoded in the current picture. Here, the current picture means a picture including the current block. Information indicating whether the current picture reference is applied to the current block may be signalled through a bitstream. For example, the information may be a 1-bit flag. When the flag is true, the prediction encoding mode of the current block may be determined as the current picture reference, and when the flag is false, the prediction mode of the current block may be determined as inter prediction.

Alternatively, the prediction encoding mode of the current block may be determined based on a reference picture index. For example, when the reference picture index indicates the current picture, the prediction encoding mode of the current block may be determined as the current picture reference. When the reference picture index indicates a picture other than the current picture, the prediction encoding mode of the current block may be determined as inter prediction. That is, the current picture reference is a prediction method using information on an area in which encoding/decoding has been completed in the current picture, and inter prediction is a prediction method using information on another picture in which the encoding/decoding has been completed.

The combined prediction represents an encoding mode in which two or more among the intra prediction, the inter prediction, and the current reference picture are combined. For example, when the combined prediction is applied, a first prediction block may be generated based on one among the intra prediction, the inter prediction, and the current picture referencing, and a second prediction block may be generated based on another one. When the first prediction block and the second prediction block are generated, a final prediction block may be generated through an average operation or a weighted sum operation of the first prediction block and the second prediction block. Information indicating whether or not the combined prediction is applied may be signalled through a bitstream. The information may be a 1-bit flag.

Figure 4:
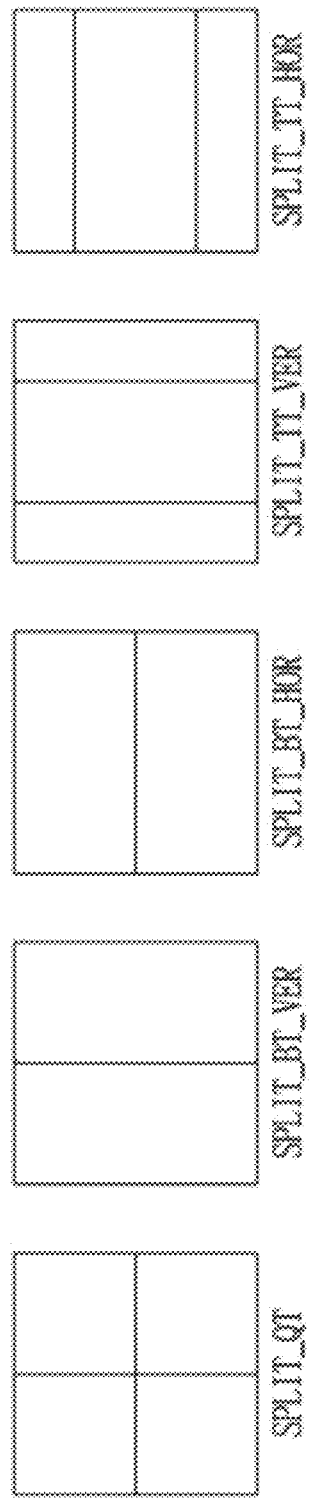
FIG. 4 is a view showing various partitioning types of a coding block.

FIG. 4 is a view showing various partitioning types of a coding block.

The coding block may be partitioned into a plurality of coding blocks based on quad tree partitioning, binary tree partitioning, or ternary tree partitioning. The partitioned coding block may be partitioned again into a plurality of coding blocks based on the quad tree partitioning, the binary tree partitioning, or the ternary tree partitioning.

The quad tree partitioning refers to a partitioning technique that partitions a current block into four blocks. As a result of the quad tree partitioning, the current block may be partitioned into four square-shaped partitions (see 'SPLIT_QT' of FIG. 4(a)).

The binary tree partitioning refers to a partitioning technique that partitions a current block into two blocks. Partitioning a current block into two blocks along the vertical direction (i.e., using a vertical line crossing the current block) may be referred to as vertical direction binary tree partitioning, and partitioning a current block into two blocks along the horizontal direction (i.e., using a horizontal line crossing the current block) may be referred to as horizontal direction binary tree partitioning. As a result of the binary tree partitioning, the current block may be partitioned into two non-square shaped partitions. 'SPLIT_BT_VER' of FIG. 4 (b) shows a result of the vertical direction binary tree partitioning, and 'SPLIT_BT_HOR' of FIG. 4 (c) shows a result of the horizontal direction binary tree partitioning.

The ternary tree partitioning refers to a partitioning technique that partitions a current block into three blocks. Partitioning a current block into three blocks along the vertical direction (i.e., using two vertical lines crossing the current block) may be referred to as vertical direction ternary tree partitioning, and partitioning a current block into three blocks along the horizontal direction (i.e., using two horizontal lines crossing the current block) may be referred to as horizontal direction ternary tree partitioning. As a result of the ternary tree partitioning, the current block may be partitioned into three non-square shaped partitions. At this point, the width/height of a partition positioned at the center of the current block may be twice as large as the width/height of the other partitions. 'SPLIT_TT_VER' of FIG. 4 (d) shows a result of the vertical direction ternary tree partitioning, and 'SPLIT_TT_HOR' of FIG. 4 (e) shows a result of the horizontal direction ternary tree partitioning.

The number of times of partitioning a coding tree unit may be defined as a partitioning depth. The maximum partitioning depth of a coding tree unit may be determined at the sequence or picture level. Accordingly, the maximum partitioning depth of a coding tree unit may be different for each sequence or picture.

Alternatively, the maximum partitioning depth for each partitioning technique may be individually determined. For example, the maximum partitioning depth allowed for the quad tree partitioning may be different from the maximum partitioning depth allowed for the binary tree partitioning and/or the triple tree partitioning.

The encoder may signal information indicating at least one among the partitioning type and the partitioning depth of the current block through a bitstream. The decoder may determine the partitioning type and the partitioning depth of a coding tree unit based on the information parsed from the bitstream.

Figure 5:
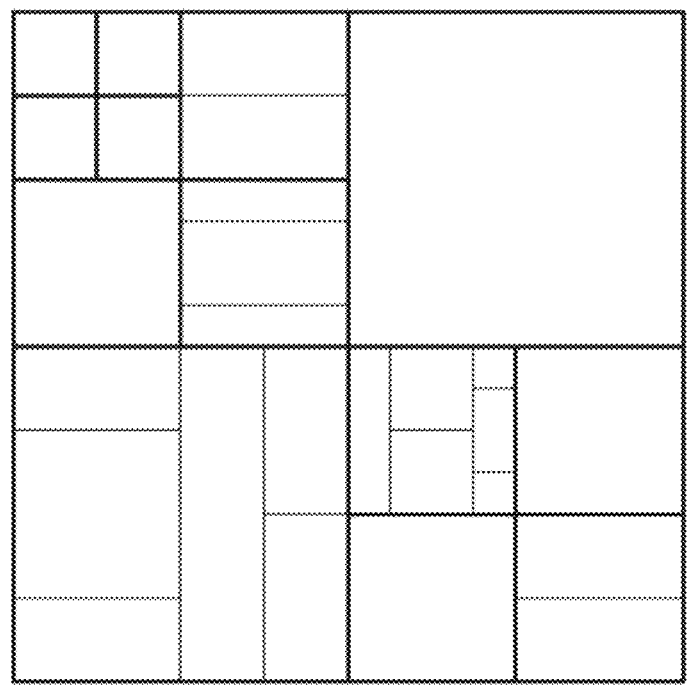
FIG. 5 is a view showing a partitioning pattern of a coding tree unit.

FIG. 5 is a view showing a partitioning pattern of a coding tree unit.

Partitioning a coding block using a partitioning technique such as quad tree partitioning, binary tree partitioning, and/or triple tree partitioning may be referred to as multi-tree partitioning.

Coding blocks generated by applying the multi-tree partitioning to a coding block may be referred to as lower coding blocks. When the partitioning depth of a coding block is k, the partitioning depth of the lower coding blocks is set to k+1.

Contrarily, for coding blocks having a partitioning depth of k+1, a coding block having a partitioning depth of k may be referred to as an upper coding block.

The partitioning type of the current coding block may be determined based on at least one among a partitioning type of an upper coding block and a partitioning type of a neighboring coding block. Here, the neighboring coding block is a coding block adjacent to the current coding block and may include at least one among a top neighboring block and a left neighboring block of the current coding block, and a neighboring block adjacent to the top-left corner. Here, the partitioning type may include at least one among whether or not a quad tree partitioning, whether or not a binary tree partitioning, binary tree partitioning direction, whether or not a triple tree partitioning, and ternary tree partitioning direction.

In order to determine a partitioning type of a coding block, information indicating whether or not the coding block can be partitioned may be signalled through a bitstream. The information is a 1-bit flag of 'split_cu_flag', and when the flag is true, it indicates that the coding block is partitioned by a multi-tree partitioning technique.

When split_cu_flag is true, information indicating whether the coding block is quad-tree partitioned may be signalled through a bitstream. The information is a 1-bit flag of split_qt_flag, and when the flag is true, the coding block may be partitioned into four blocks.

For example, in the example shown in FIG. 5, as a coding tree unit is quad-tree partitioned, four coding blocks having a partitioning depth of 1 are generated. In addition, it is shown that quad tree partitioning is applied again to the first and fourth coding blocks among the four coding blocks generated as a result of the quad tree partitioning. As a result, four coding blocks having a partitioning depth of 2 may be generated.

In addition, coding blocks having a partitioning depth of 3 may be generated by applying the quad tree partitioning again to a coding block having a partitioning depth of 2.

When quad tree partitioning is not applied to the coding block, whether binary tree partitioning or ternary tree partitioning is performed on the coding block may be determined considering at least one among the size of the coding block, whether the coding block is positioned at the picture boundary, the maximum partitioning depth, and the partitioning type of a neighboring block. When it is determined to perform binary tree partitioning or ternary tree partitioning on the coding block, information indicating the partitioning direction may be signalled through a bitstream. The information may be a 1-bit flag of mtt_split_cu_vertical_flag. Based on the flag, whether the partitioning direction is a vertical direction or a horizontal direction may be determined. Additionally, information indicating whether binary tree partitioning or ternary tree partitioning is applied to the coding block may be signalled through a bitstream. The information may be a 1-bit flag of mtt_split_cu_binary_flag. Based on the flag, whether binary tree partitioning or ternary tree partitioning is applied to the coding block may be determined.

For example, in the example shown in FIG. 5, it is shown that vertical direction binary tree partitioning is applied to a coding block having a partitioning depth of 1, vertical direction ternary tree partitioning is applied to the left-side coding block among the coding blocks generated as a result of the partitioning, and vertical direction binary tree partitioning is applied to the right-side coding block.

Inter prediction is a prediction encoding mode that predicts a current block by using information of a previous picture. For example, a block at the same position as the current block in the previous picture (hereinafter, a collocated block) may be set as the prediction block of the current block. Hereinafter, a prediction block generated based on a block at the same position as the current block will be referred to as a collocated prediction block.

On the other hand, when an object existing in the previous picture has moved to another position in the current picture, the current block may be effectively predicted by using a motion of the object. For example, when the moving direction and the size of an object can be known by comparing the previous picture and the current picture, a prediction block (or a prediction picture) of the current block may be generated considering motion information of the object. Hereinafter, the prediction block generated using motion information may be referred to as a motion prediction block.

A residual block may be generated by subtracting the prediction block from the current block. At this point, when there is a motion of an object, the energy of the residual block may be reduced by using the motion prediction block instead of the collocated prediction block, and therefore, compression performance of the residual block can be improved.

As described above, generating a prediction block by using motion information may be referred to as motion compensation prediction. In most inter prediction, a prediction block may be generated based on the motion compensation prediction.

The motion information may include at least one among a motion vector, a reference picture index, a prediction direction, and a bidirectional weight index. The motion vector represents the moving direction and the size of an object. The reference picture index specifies a reference picture of the current block among reference pictures included in a reference picture list. The prediction direction indicates any one among unidirectional L0 prediction, unidirectional L1 prediction, and bidirectional prediction (L0 prediction and L1 prediction). According to the prediction direction of the current block, at least one among motion information in the L0 direction and motion information in the L1 direction may be used. The bidirectional weight index specifies a weighting value applied to a L0 prediction block and a weighting value applied to a L1 prediction block.

Figure 6:
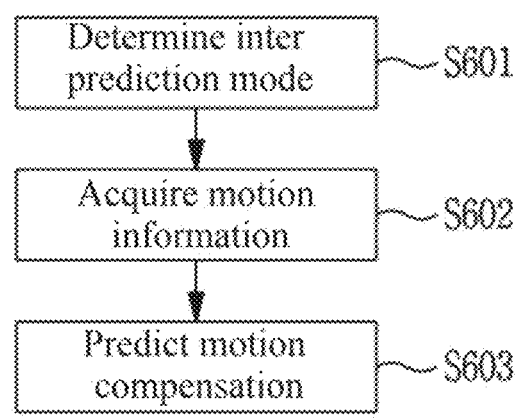
FIG. 6 is a flowchart illustrating an inter prediction method according to an embodiment of the present disclosure.

FIG. 6 is a flowchart illustrating an inter prediction method according to an embodiment of the present disclosure.

Referring to FIG. 6, the inter prediction method includes the steps of determining an inter prediction mode of a current block (S601), acquiring motion information of the current block according to the determined inter prediction mode (S602), and performing motion compensation prediction for the current block based on the acquired motion information (S603).

Here, the inter prediction mode represents various techniques for determining motion information of the current block, and may include an inter prediction mode that uses translational motion information and an inter prediction mode that uses affine motion information. For example, the inter prediction mode using translational motion information may include a merge mode and a motion vector prediction mode, and the inter prediction mode using affine motion information may include an affine merge mode and an affine motion vector prediction mode. The motion information of the current block may be determined based on a neighboring block adjacent to the current block or information parsed from a bitstream according to the inter prediction mode.

Hereinafter, the inter prediction method using affine motion information will be described in detail.

Figure 7:
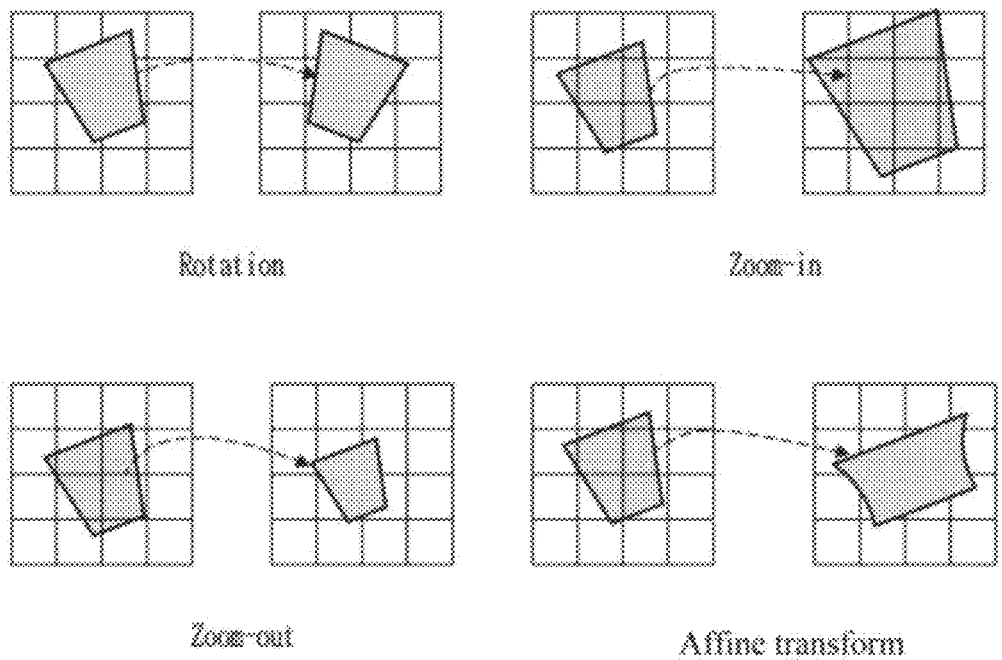
FIG. 7 is a view showing nonlinear motions of an object.

FIG. 7 is a view showing nonlinear motions of an object.

A nonlinear motion of an object may be generated in a video. For example, as shown in the example of FIG. 7, a nonlinear motion of an object, such as zoom-in, zoom-out, rotation, affine transform or the like of a camera, may occur. When a nonlinear motion of an object occurs, the motion of the object cannot be effectively expressed with a translational motion vector. Accordingly, encoding efficiency can be improved by using an affine motion instead of a translational motion in an area where a nonlinear motion of an object occurs.

Figure 8:
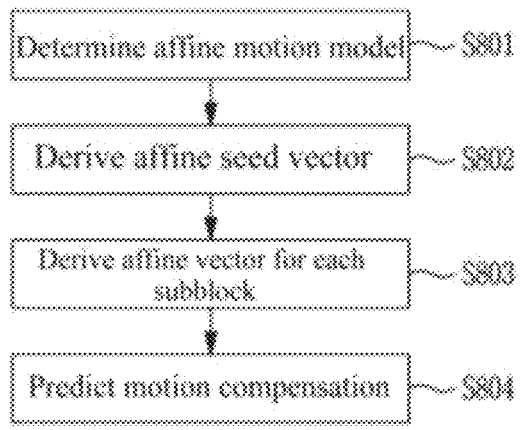
FIG. 8 is a flowchart illustrating an inter prediction method based on an affine motion according to an embodiment of the present disclosure.

FIG. 8 is a flowchart illustrating an inter prediction method based on an affine motion according to an embodiment of the present disclosure.

Whether an inter prediction technique based on an affine motion is applied to the current block may be determined based on the information parsed from a bitstream. Specifically, whether the inter prediction technique based on an affine motion is applied to the current block may be determined based on at least one among a flag indicating whether the affine merge mode is applied to the current block and a flag indicating whether the affine motion vector prediction mode is applied to the current block.

When the inter prediction technique based on an affine motion is applied to the current block, an affine motion model of the current block may be determined (S801). The affine motion model may be determined as at least one among a six-parameter affine motion model and a four-parameter affine motion model. The six-parameter affine motion model expresses an affine motion using six parameters, and the four-parameter affine motion model expresses an affine motion using four parameters.

Equation 1 expresses an affine motion using six parameters. The affine motion represents a translational motion for a predetermined area determined by affine seed vectors.

$$v_x = ax - by + e$$
$$v_y = cx + dy + f$$
[Equation 1]

When an affine motion is expressed using six parameters, a complicated motion can be expressed. However, as the number of bits required for encoding each of the parameters increases, encoding efficiency may be lowered. Accordingly, the affine motion may be expressed using four parameters. Equation 2 expresses an affine motion using four parameters.

$$v_x = ax - by + e$$
$$v_y = bx + ay + f$$
[Equation 2]

Information for determining an affine motion model of the current block may be encoded and signalled through a bitstream. For example, the information may be a 1-bit flag of 'affine_type_flag'. When the numerical value of the flag is 0, it may indicate that a 4-parameter affine motion model is applied, and when the numerical value of the flag is 1, it may indicate that a 6-parameter affine motion model is applied. The flag may be encoded by the unit of slice, tile, or block (e.g., by the unit of coding block or coding tree). When a flag is signalled at the slice level, an affine motion model determined at the slice level may be applied to all blocks belonging to the slice.

Alternatively, an affine motion model of the current block may be determined based on an affine inter prediction mode of the current block. For example, when the affine merge mode is applied, the affine motion model of the current block may be determined as a 4-parameter motion model. On the other hand, when the affine motion vector prediction mode is applied, information for determining the affine motion model of the current block may be encoded and signalled through a bitstream. For example, when the affine motion vector prediction mode is applied to the current block, the affine motion model of the current block may be determined based on the 1-bit flag of 'affine_type_flag'.

Next, an affine seed vector of the current block may be derived (S802). When a 4-parameter affine motion model is selected, motion vectors at two control points of the current block may be derived. On the other hand, when a 6-parameter affine motion model is selected, motion vectors at three control points of the current block may be derived. The motion vector at a control point may be referred to as an affine seed vector. The control point may include at least one among the top-left corner, the top-right corner, and the bottom-left corner of the current block.

Figure 9:
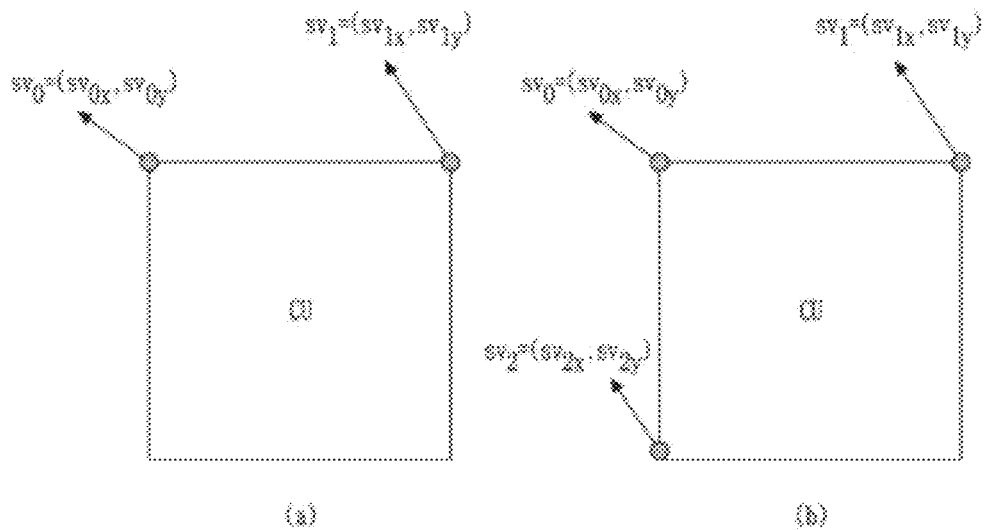
FIG. 9 is a view showing an example of affine seed vectors of each affine motion model.

FIG. 9 is a view showing an example of affine seed vectors of each affine motion model.

In the 4-parameter affine motion model, affine seed vectors may be derived for two among the top-left corner, the top-right corner, and the bottom-left corner. For example, as shown in the example of FIG. 9 (a), when a 4-parameter affine motion model is selected, an affine vector may be derived using the affine seed vector $sv_0$ for the top-left corner of the current block (e.g., top-left sample (x1, y1)) and the affine seed vector $sv_1$ for the top-right corner of the current block (e.g., the top-right sample (x1, y1)). It is also possible to use an affine seed vector for the bottom-left corner instead of the affine seed vector for the top-left corner, or use an affine seed vector for the bottom-left corner instead of the affine seed vector for the top-right corner.

In the 6-parameter affine motion model, affine seed vectors may be derived for the top-left corner, the top-right corner, and the bottom-left corner. For example, as shown in the example of FIG. 9 (b), when a 6-parameter affine motion model is selected, an affine vector may be derived using the affine seed vector $sv_0$ for the top-left corner of the current block (e.g., top-left sample (x1, y1)), the affine seed vector $sv_1$ for the top-right corner of the current block (e.g., the top-right sample (x1, y1)), and the affine seed vector $sv_2$ for the top-left corner of the current block (e.g., top-left sample (x2, y2)).

In the embodiment described below, in the 4-parameter affine motion model, the affine seed vectors of the top-left control point and the top-right control point will be referred to as a first affine seed vector and a second affine seed vector, respectively. In the embodiments using the first affine seed vector and the second affine seed vector described below, at least one among the first affine seed vector and the second affine seed vector may be replaced by the affine seed vector of the bottom-left control point (a third affine seed vector) or the affine seed vector of the bottom-right control point (a fourth affine seed vector).

In addition, in the 6-parameter affine motion model, the affine seed vectors of the top-left control point, the top-right control point, and the bottom-left control point will be referred to as a first affine seed vector, a second affine seed vector, and a third affine seed vector, respectively. In the embodiments using the first affine seed vector, the second affine seed vector, and the third affine seed vector described below, at least one among the first affine seed vector, the second affine seed vector, and the third affine seed vector may be replaced by the affine seed vector of the bottom-right control point (a fourth affine seed vector).

An affine vector may be derived for each subblock by using the affine seed vectors (S803). Here, the affine vector represents a translational motion vector derived based on the affine seed vectors. The affine vector of a subblock may be referred to as an affine subblock motion vector or a subblock motion vector.

Figure 10:
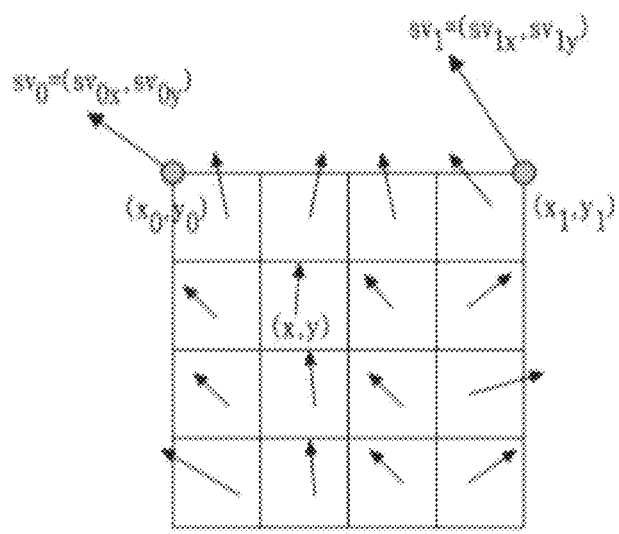
FIG. 10 is a view showing an example of affine vectors of subblocks in a 4-parameter motion model.

FIG. 10 is a view showing an example of affine vectors of subblocks in a 4-parameter motion model.

The affine vector of the subblock may be derived based on the position of the control point, the position of the subblock, and the affine seed vector. For example, Equation 3 shows an example of deriving an affine subblock vector.

$$v_x = \frac{(sv_{1x} - sv_{0x})}{(x_1 - x_0)}(x - x_0) - \frac{(sv_{1y} - sv_{0y})}{(x_1 - x_0)}(y - y_0) + sv_{0x}$$
$$v_y = \frac{(sv_{1y} - sv_{0y})}{(x_1 - x_0)}(x - x_0) - \frac{(sv_{1x} - sv_{0x})}{(x_1 - x_0)}(y - y_0) + sv_{0y}$$
[Equation 3]

In Equation 3, (x, y) denotes the position of a subblock. Here, the position of a subblock indicates the position of a reference sample included in the subblock. The reference sample may be a sample positioned at the top-left corner of the subblock, or a sample of which at least one among the x-axis and y-axis coordinates is a center point. $(x_0, y_0)$ denotes the position of the first control point, and $(sv_{0x}, sv_{0y})$ denotes the first affine seed vector. In addition, $(x_1, y_1)$ denotes the position of the second control point, and ($sv_{1x}$, $sv_{1y}$) denotes the second affine seed vector.

When the first control point and the second control point correspond to the top-left corner and the top-right corner of the current block respectively, $x_1-x_0$ may be set to a value equal to the width of the current block.

Thereafter, motion compensation prediction for each sub-block may be performed using the affine vector of each subblock (S804). As a result of performing the motion compensation prediction, a prediction block for each sub-block may be generated. The prediction blocks of the subblocks may be set as the prediction blocks of the current block.

Next, an inter prediction method using translational motion information will be described in detail.

Motion information of the current block may be derived from motion information of another block. Here, another block may be a block encoded/decoded by inter prediction before the current block. Setting the motion information of the current block to be equal to the motion information of another block may be defined as a merge mode. In addition, setting the motion vector of another block as the prediction value of the motion vector of the current block may be defined as a motion vector prediction mode.

Figure 11:
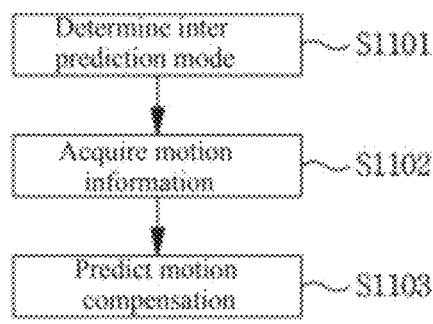
FIG. 11 is a flowchart illustrating a process of deriving motion information of a current block using a merge mode.

FIG. 11 is a flowchart illustrating a process of deriving motion information of a current block using a merge mode.

A merge candidate of the current block may be derived (S1101). The merge candidate of the current block may be derived from a block encoded/decoded by inter prediction before the current block.

Figure 12:
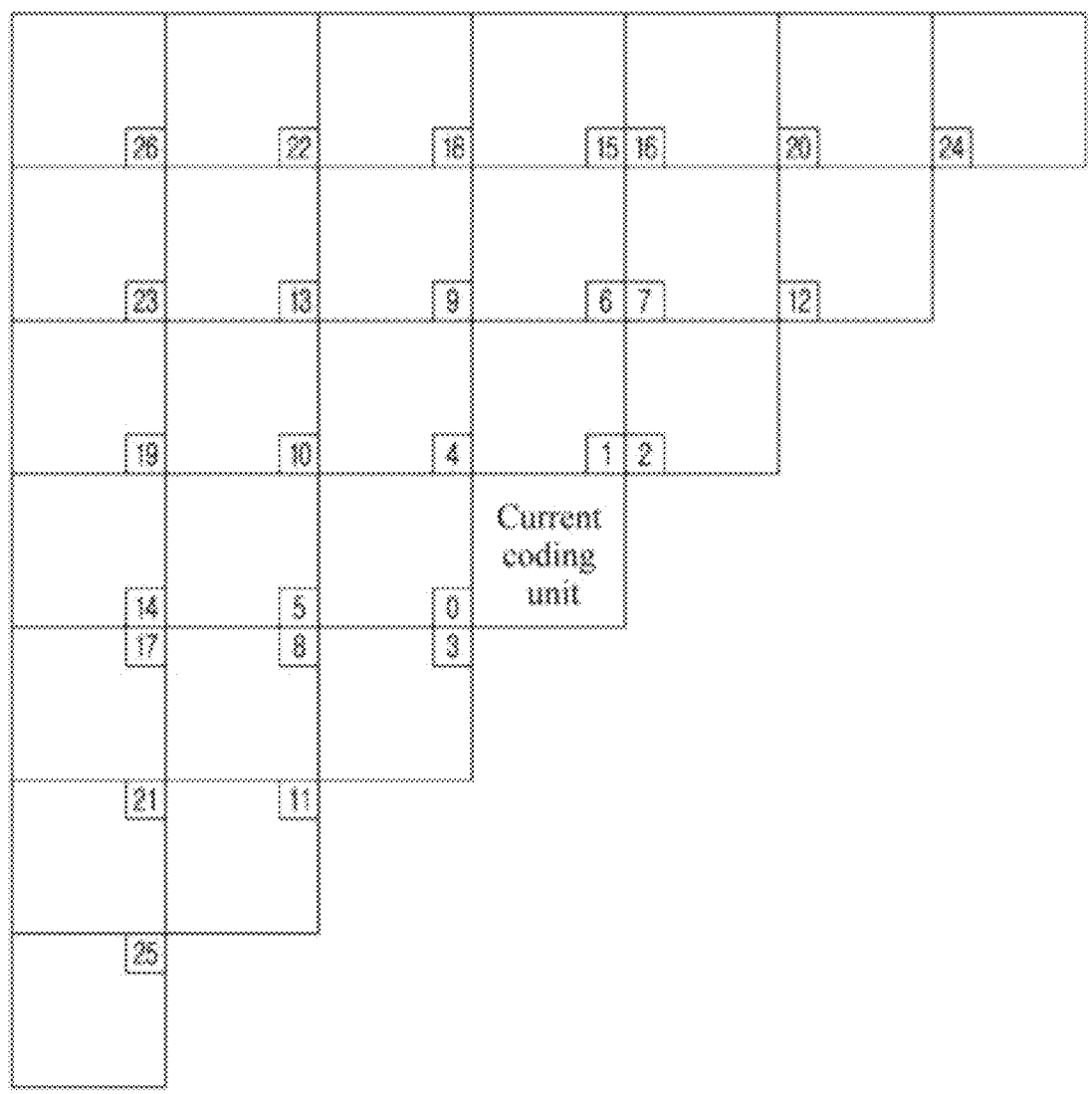
FIG. 12 is a view showing an example of candidate blocks used for deriving a merge candidate.

FIG. 12 is a view showing an example of candidate blocks used for deriving a merge candidate.

The candidate blocks may include at least one among neighboring blocks including a sample adjacent to the current block or non-neighboring blocks including a sample not adjacent to the current block. Hereinafter, samples for determining candidate blocks are defined as reference samples. In addition, a reference sample adjacent to the current block is referred to as a neighboring reference sample, and a reference sample not adjacent to the current block is referred to as a non-neighboring reference sample.

The neighboring reference sample may be included in a neighboring column of the leftmost column of the current block or a neighboring row of the uppermost row of the current block. For example, when the coordinates of the top-left sample of the current block is (0, 0), at least one among a block including a reference sample at the position of (−1, H-1), a block including a reference sample at the position of (W-1, −1), a block including a reference sample at the position of (W, −1), a block including a reference sample at the position of (−1, H), and a block including a reference sample at the position of (−1, −1) may be used as a candidate block. Referring to the drawing, neighboring blocks of index 0 to 4 may be used as candidate blocks.

The non-neighboring reference sample represents a sample of which at least one among an x-axis distance and a y-axis distance from a reference sample adjacent to the current block has a predefined value. For example, at least one among a block including a reference sample of which the x-axis distance from the left reference sample is a predefined value, a block including a non-neighboring sample of which the y-axis distance from the top reference sample is a predefined value, and a block including a non-neighboring sample of which the x-axis distance and the y-axis distance from the top-left reference sample are predefined values may be used as a candidate block. The predefined values may be a natural number such as 4, 8, 12, 16 or the like. Referring to the drawing, at least one among the blocks of index 5 to 26 may be used as a candidate block.

A sample not positioned on the same vertical line, horizontal line, or diagonal line as the neighboring reference sample may be set as a non-neighboring reference sample.

Figure 13:
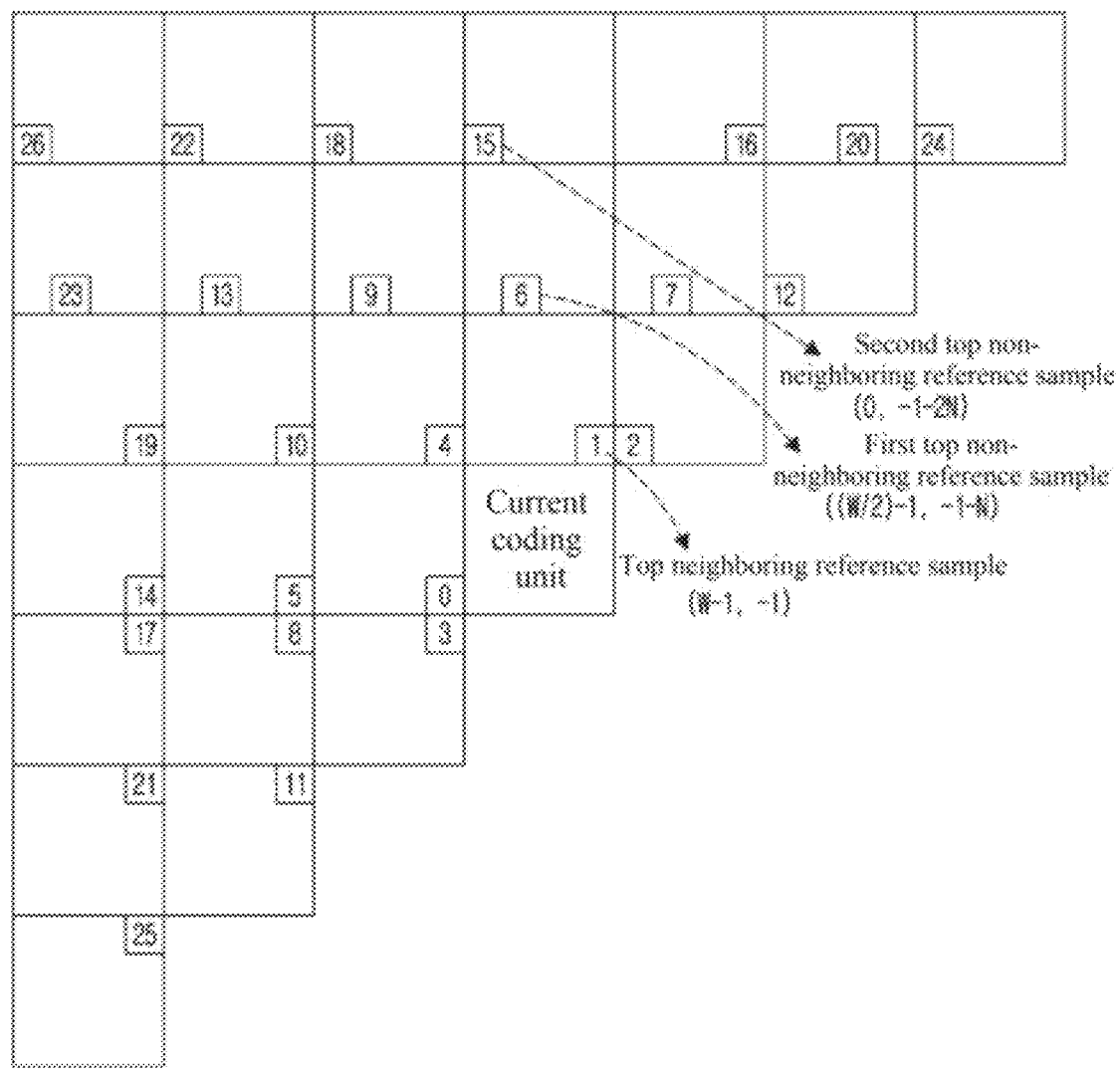
FIG. 13 is a view showing positions of reference samples.

FIG. 13 is a view showing positions of reference samples.

As shown in the example of FIG. 13, the x coordinates of the top non-neighboring reference samples may be set to be different from the x coordinates of the top neighboring reference samples. For example, when the position of the top neighboring reference sample is (W-1, −1), the position of a top non-neighboring reference sample separated as much as N from the top neighboring reference sample on the y-axis may be set to ((W/2)-1, −1-N), and the position of a top non-neighboring reference sample separated as much as 2N from the top neighboring reference sample on the y-axis may be set to (0, −1-2N). That is, the position of a non-adjacent reference sample may be determined based on the position of an adjacent reference sample and a distance from the adjacent reference sample.

Hereinafter, a candidate block including a neighboring reference sample among the candidate blocks is referred to as a neighboring block, and a block including a non-neighboring reference sample is referred to as a non-neighboring block.

When the distance between the current block and the candidate block is greater than or equal to a threshold value, the candidate block may be set to be unavailable as a merge candidate. The threshold value may be determined based on the size of the coding tree unit. For example, the threshold value may be set to the height (ctu_height) of the coding tree unit or a value obtained by adding or subtracting an offset to or from the height (e.g., ctu_height±N) of the coding tree unit. The offset N is a value predefined in the encoder and the decoder, and may be set to 4, 8, 16, 32 or ctu_height.

When the difference between the y-axis coordinate of the current block and the y-axis coordinate of a sample included in a candidate block is greater than the threshold value, the candidate block may be determined to be unavailable as a merge candidate.

Alternatively, a candidate block that does not belong to the same coding tree unit as the current block may be set to be unavailable as a merge candidate. For example, when a reference sample deviates from the top boundary of a coding tree unit to which the current block belongs, a candidate block including the reference sample may be set to be unavailable as a merge candidate.

When the top boundary of the current block is adjacent to the top boundary of the coding tree unit, a plurality of candidate blocks is determined to be unavailable as a merge candidate, and thus the encoding/decoding efficiency of the current block may decrease. To solve this problem, candidate blocks may be set so that the number of candidate blocks positioned on the left side of the current block is greater than the number of candidate blocks positioned on the top of the current block.

Figure 14:
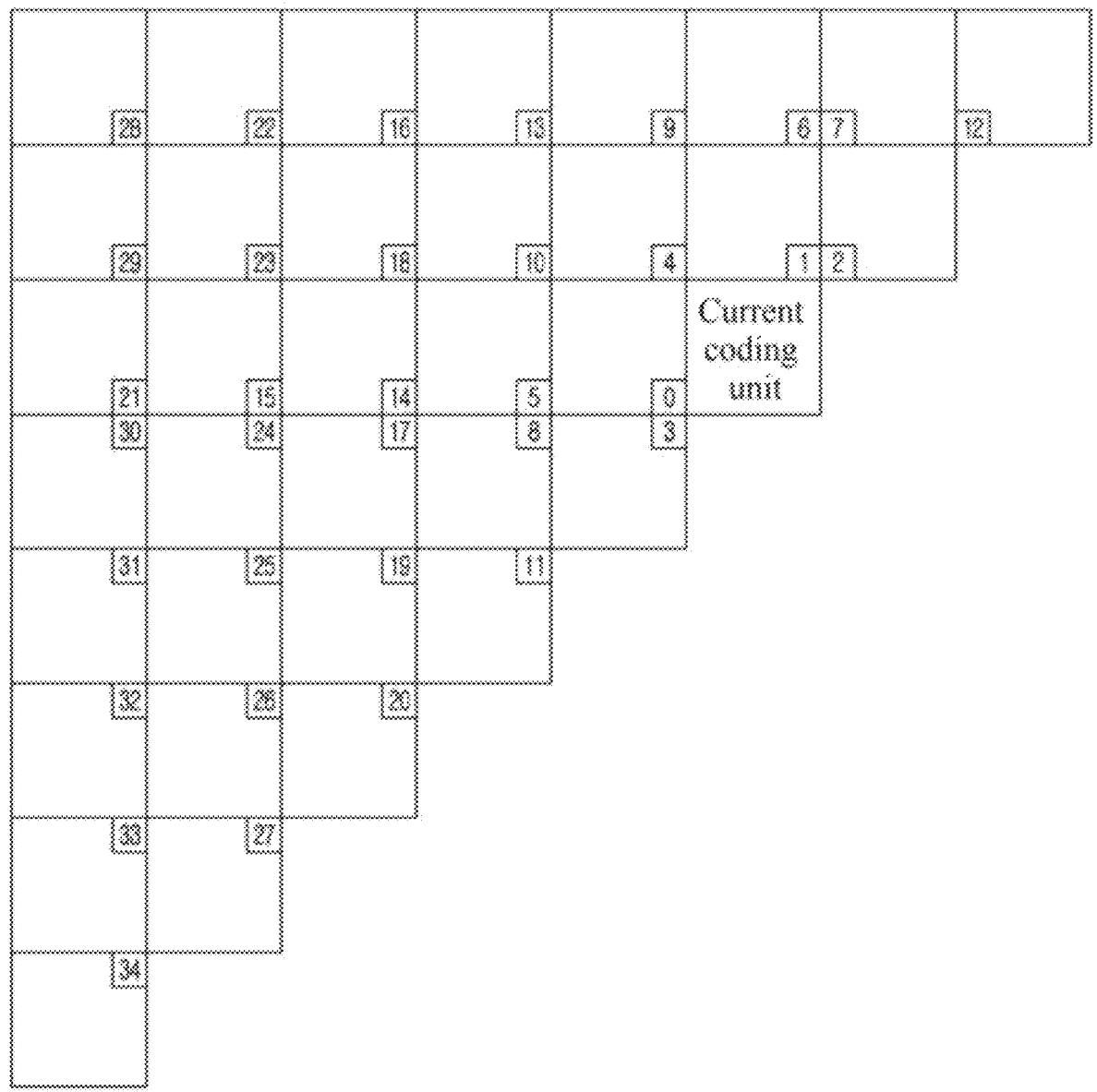
FIG. 14 is a view showing an example of candidate blocks used for deriving a merge candidate.

FIG. 14 is a view showing an example of candidate blocks used for deriving a merge candidate.

As shown in the example of FIG. 14, top blocks belonging to top N block columns of the current block and left-side blocks belonging to M left-side block columns of the current block may be set as candidate blocks. At this point, the number of left-side candidate blocks may be set to be greater than the number of top candidate blocks by setting M to be greater than N.

For example, the difference between the y-axis coordinate of the reference sample in the current block and the y-axis coordinate of the top block that can be used as a candidate block may be set not to exceed N times of the height of the current block. In addition, the difference between the x-axis coordinate of the reference sample in the current block and the x-axis coordinate of the left-side block that can be used as a candidate block may be set not to exceed M times of the width of the current block.

For example, in the example shown in FIG. 14, it is shown that blocks belonging to the top two block columns of the current block and blocks belonging to the left five block columns of the current block are set as candidate blocks.

As another example, when a candidate block does not belong to a coding tree unit the same as that of the current block, a merge candidate may be derived using a block belonging to the same coding tree unit as the current block or a block including a reference sample adjacent to the boundary of the coding tree unit, instead of the candidate block.

Figure 15:
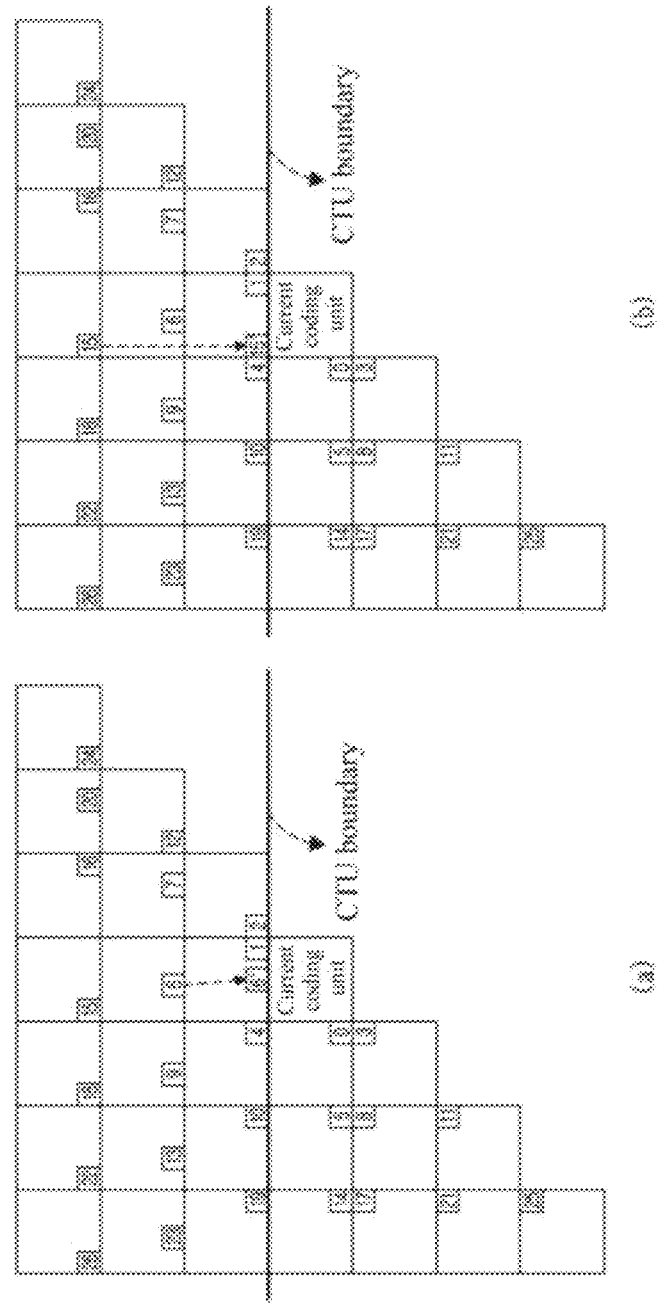
FIG. 15 is a view showing an example in which the position of a reference sample is changed.

FIG. 15 is a view showing an example in which the position of a reference sample is changed.

When a reference sample is included in a coding tree unit different from the current block, and the reference sample is not adjacent to the boundary of the coding tree unit, a candidate block may be determined using a reference sample adjacent to the boundary of the coding tree unit, instead of the reference sample.

For example, in the examples shown in FIGS. 15 (a) and 15 (b), when the top boundary of the current block and the top boundary of the coding tree unit are in contact with each other, the reference samples on the top of the current block belong to a coding tree unit different from the current block. Among the reference samples belonging to the coding tree unit different from the current block, a reference sample not adjacent to the top boundary of the coding tree unit may be replaced with a sample adjacent to the top boundary of the coding tree unit.

For example, as shown in the example of FIG. 15 (a), the reference sample at position 6 is replaced with the sample at position 6' positioned at the top boundary of the coding tree unit, and as shown in the example of FIG. 15 (b), the reference sample at position 15 is replaced with the sample at position 15' positioned at the top boundary of the coding tree unit. At this point, the y coordinate of the replacement sample is changed to a position adjacent to the coding tree unit, and the x coordinate of the replacement sample may be set to be equal to the reference sample. For example, the sample at position 6' may have the same x-coordinate as the sample at position 6, and the sample at position 15' may have the same x-coordinate as the sample at position 15.

Alternatively, a value obtained by adding or subtracting an offset to or from the x coordinate of the reference sample may be set as the x coordinate of the replacement sample. For example, when the x-coordinates of the neighboring reference sample positioned on the top of the current block and the non-neighboring reference sample are the same, a value obtained by adding or subtracting an offset to or from the x coordinate of the reference sample may be set as the x coordinate of the replacement sample. This is for preventing the replacement sample replacing the non-neighboring reference sample from being placed at the same position as another non-neighboring reference sample or neighboring reference sample.

Figure 16:
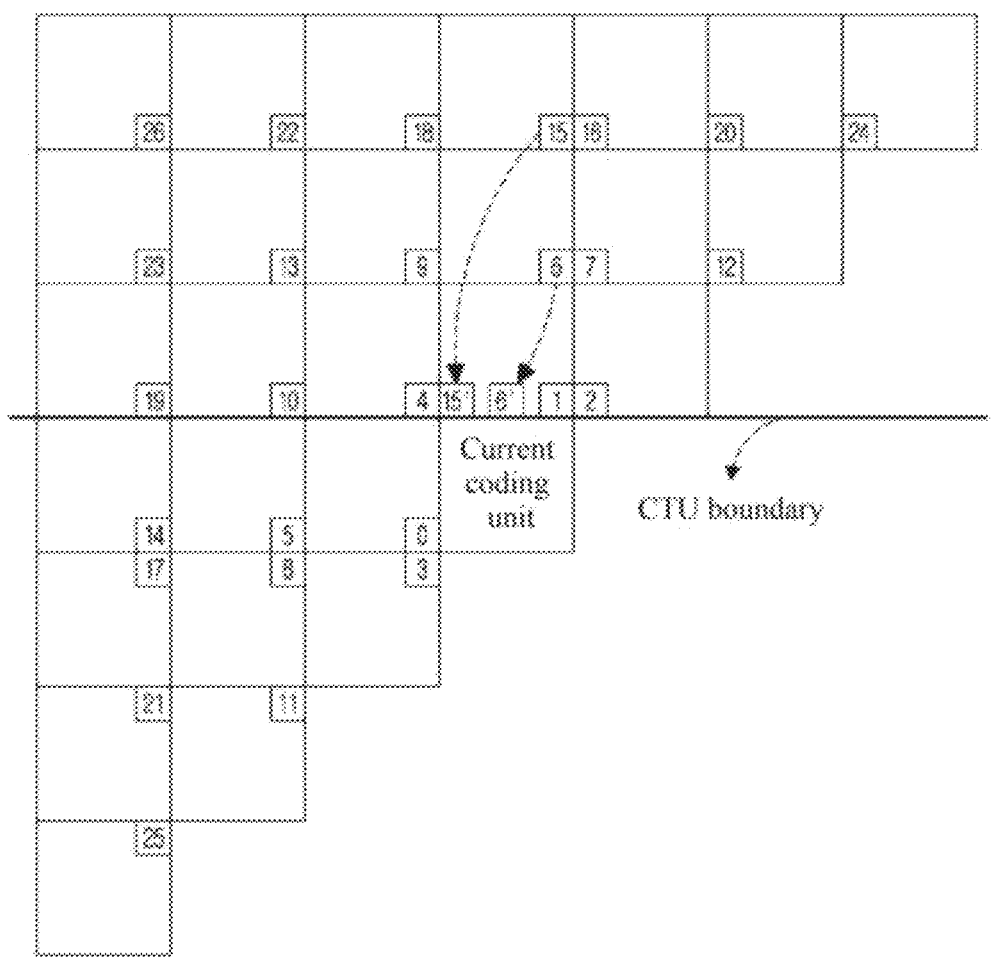
FIG. 16 is a view showing an example in which the position of a reference sample is changed.

FIG. 16 is a view showing an example in which the position of a reference sample is changed.

In replacing a reference sample that is included in a coding tree unit different from the current block and is not adjacent to the boundary of the coding tree unit with a sample positioned at the boundary of the coding tree unit, a value obtained by adding or subtracting an offset to and from the x coordinate of the reference sample may be set as the x-coordinate of the replacement sample.

For example, in the example shown in FIG. 16, the reference sample at position 6 and the reference sample at position 15 may be replaced with the sample at position 6' and the sample at position 15' respectively, of which the y coordinates are the same as that of the row adjacent to the top boundary of the coding tree unit. At this point, the x-coordinate of the sample at position 6' may be set to a value obtained by subtracting W/2 from the x-coordinate of the reference sample at position 6, and the x-coordinate of the sample at position 15' may be set to a value obtained by subtracting W−1 from the x-coordinate of the reference sample at position 15.

Unlike the examples shown in FIGS. 15 and 16, the y coordinate of the row positioned on the top of the uppermost row of the current block or the y coordinate of the top boundary of the coding tree unit may be set as the y coordinate of the replacement sample.

Although not shown, a sample replacing the reference sample may be determined based on the left-side boundary of the coding tree unit. For example, when the reference sample is not included in the same coding tree unit as the current block and is not adjacent to the left-side boundary of the coding tree unit, the reference sample may be replaced with a sample adjacent to the left-side boundary of the coding tree unit. At this point, the replacement sample may have a y-coordinate the same as that of the reference sample, or may have a y-coordinate obtained by adding or subtracting an offset to and from the y-coordinate of the reference sample.

Thereafter, a block including the replacement sample may be set as a candidate block, and a merge candidate of the current block may be derived based on the candidate block.

A merge candidate may also be derived from a temporally neighboring block included in a picture different from the current block. For example, a merge candidate may be derived from a collocated block included in a collocated picture.

The motion information of the merge candidate may be set to be equal to the motion information of the candidate block. For example, at least one among a motion vector, a reference picture index, a prediction direction, and a bidirectional weight index of the candidate block may be set as motion information of the merge candidate.

A merge candidate list including merge candidates may be generated (S1102). The merge candidates may be divided into an adjacent merge candidate derived from a neighboring block adjacent to the current block and a non-adjacent merge candidate derived from a non-neighboring block.

Indexes of the merge candidates in the merge candidate list may be assigned in a predetermined order. For example, an index assigned to an adjacent merge candidate may have a value smaller than an index assigned to a non-adjacent merge candidate. Alternatively, an index may be assigned to each of the merge candidates based on the index of each block shown in FIG. 12 or 14.

When a plurality of merge candidates is included in the merge candidate list, at least one among the plurality of merge candidates may be selected (S1103). At this point, information indicating whether motion information of the current block is derived from an adjacent merge candidate may be signalled through a bitstream. The information may be a 1-bit flag. For example, a syntax element is Adjancent-MergeFlag indicating whether the motion information of the current block is derived from an adjacent merge candidate may be signalled through a bitstream. When the value of the syntax element isAdjancentMergeFlag is 1, motion information of the current block may be derived based on the adjacent merge candidate. On the other hand, when the value of the syntax element isAdjancentMergeFlag is 0, motion information of the current block may be derived based on a non-adjacent merge candidate.

Table 1 shows a syntax table including syntax element isAdjancentMergeFlag.

TABLE 1

| | Descriptor |
|---|---|
| coding_unit (x0, y0, cbWidth, cbHeight, treeType) { | |
|   if (slice_type! = I) { | |
|     pred_mode_flag | ae(v) |
|   } | |
|   if (CuPredMode[x0][y0] = = MODE_INTRA) { | |
|   if (treeType = = SINGLE_TREE \|\| treeType = = DUAL_TREE_LUMA) { | |
|     intra_luma_mpm_flag[x0][y0] | |
|     if (intra_luma_mpm_flag[x0][y0]) | |
|       intra_luma_mpm_idx[x0][y0] | ae(v) |
|     else | |
|       intra_luma_mpm_remainder[x0][y0] | ae(v) |
|   } | |
|   if (treeType = = SINGLE_TREE \|\| treeType = = DUAL_TREE_CHROMA) | |
|     intra_chroma_pred_mode[x0][y0] | ae(v) |
|   } else { | |
|     if (cu_skip_falg[x0][y0]) { | |
|       if (MaxNumMergeCand > 1){ | |
|         isAdjacentMergeflag | ae(v) |
|         if (isAdjcanetMergeflag){ | |
|           merge_idx[x0][y0] | ae(v) |
|         } else{ | |
|           NA_merge_idx[x0][y0] | ae(v) |
|         } | |
|       } | |
|   } else { /* MODE_INTER*/ | |
|     merge_flag[x0][y0] | ae(v) |
|     if (merge_flag[x0][y0]){ | |
|       if (MaxNumMergeCand > 1){ | |
|         isAdjacentMergeflag | ae(v) |
|         if (isAdjcanetMergeflag){ | |
|           merge_idx[x0][y0] | ae(v) |
|         } else{ | |
|           NA_merge_idx[x0][y0] | ae(v) |
|         } | |
|       } | |
|     } | |
|   } | |
|   if (CuPredMode[x0][y0]! = MODE_INTRA) | |
|     cu_cbf | ae(v) |
|   if (cu_cbf) { | |
|     transform_tree (x0, y0, cbWidth, cbHeight, treeType) | |
| } | |

Information for specifying one among a plurality of merge candidates may be signalled through a bitstream. For example, information indicating an index of any one among the merge candidates included in the merge candidate list may be signalled through a bitstream.

When isAdjacentMergeflag is 1, syntax element merge_idx specifying one among the adjacent merge candidates may be signalled. The maximum numerical value of syntax element merge_idx may be set to a value obtained by subtracting 1 from the number of adjacent merge candidates.

When isAdjacentMergeflag is 0, syntax element NA_merge_idx specifying one among the non-adjacent merge candidates may be signalled. The syntax element NA_merge_idx represents a value obtained by subtracting the number of adjacent merge candidates from the index of the non-adjacent merge candidate. The decoder may select a non-adjacent merge candidate by adding the number of adjacent merge candidates to an index specified by NA_merge_idx.

When the number of merge candidates included in the merge candidate list is smaller than a threshold value, the merge candidate included in the inter-region motion information list may be added to the merge candidate list. Here, the threshold value may be the maximum number of merge candidates that can be included in the merge candidate list or a value obtained by subtracting an offset from the maximum number of merge candidates. The offset may be a natural number such as 1, 2 or the like. The inter-region motion information list may include a merge candidate derived based on a block encoded/decoded before the current block.

The inter-region motion information list includes a merge candidate derived from a block encoded/decoded based on inter prediction in the current picture. For example, motion information of a merge candidate included in the inter-region motion information list may be set to be equal to motion information of a block encoded/decoded based on inter prediction. Here, the motion information may include at least one among a motion vector, a reference picture index, a prediction direction, and a bidirectional weight index. For convenience of explanation, a merge candidate included in the inter-region motion information list will be referred to as an inter-region merge candidate.

When a merge candidate of the current block is selected, the motion vector of the selected merge candidate is set as an initial motion vector, and motion compensation prediction may be performed for the current block using a motion vector derived by adding or subtracting an offset vector to or from the initial motion vector. Deriving a new motion vector by adding or subtracting an offset vector to or from a motion vector of a merge candidate may be defined as a merge motion difference encoding method.

Information indicating whether or not to use the merge offset encoding method may be signalled through a bitstream. The information may be flag merge_offset_vector_flag of one bit. For example, when the value of merge_offset_vector_flag is 1, it indicates that the merge motion difference encoding method is applied to the current block. When the merge motion difference encoding method is applied to the current block, the motion vector of the current block may be derived by adding or subtracting an offset vector to or from the motion vector of the merge candidate. When the value of merge_offset_vector_flag of 0, it indicates that the merge motion difference encoding method is not applied to the current block. When the merge offset encoding method is not applied, the motion vector of the merge candidate may be set as the motion vector of the current block.

The flag may be signalled only when the value of a skip flag indicating whether a skip mode is applied is true or when the value of a merge flag indicating whether a merge mode is applied is true. For example, when the value of skip_flag indicating whether the skip mode is applied to the current block is 1 or when the value of merge_flag indicating whether the merge mode is applied to the current block is 1, merge_offset_vector_flag may be encoded and signalled.

When it is determined that the merge offset encoding method is applied to the current block, at least one among information specifying one among the merge candidates included in the merge candidate list, information indicating the magnitude of the offset vector, and information indicating the direction of the offset vector may be additionally signalled.

Information for determining the maximum number of merge candidates that the merge candidate list may include may be signalled through a bitstream. For example, the maximum number of merge candidates that the merge candidate list may include may be set to a natural number of 6 or smaller.

When it is determined that the merge offset encoding method is applied to the current block, only the maximum number of merge candidates set in advance may be set as the initial motion vector of the current block. That is, the number of merge candidates that can be used by the current block may be adaptively determined according to whether the merge offset encoding method is applied. For example, when the value of merge_offset_vector_flag is set to 0, the maximum number of merge candidates that can be used by the current block may be set to M, whereas when the value of merge_offset_vector_flag is set to 1, the maximum number of merge candidates that can be used by the current block may be set to N. Here, M denotes the maximum number of merge candidates that the merge candidate list may include, and N denotes a natural number equal to or smaller than M.

For example, when M is 6 and N is 2, two merge candidates having the smallest index among the merge candidates included in the merge candidate list may be set as being available for the current block. Accordingly, a motion vector of a merge candidate having an index value of 0 or a motion vector of a merge candidate having an index value of 1 may be set as an initial motion vector of the current block. When M and N are the same (e.g., when M and N are 2), all the merge candidates included in the merge candidate list may be set as being available for the current block.

Alternatively, whether a neighboring block may be used as a merge candidate may be determined based on whether the merge motion difference encoding method is applied to the current block. For example, when the value of merge_offset_vector_flag is 1, at least one among a neighboring block adjacent to the top-right corner of the current block, a neighboring block adjacent to the bottom-left corner, and a neighboring block adjacent to the bottom-left corner may be set as being unavailable as a merge candidate. Accordingly, when the merge motion difference encoding method is applied to the current block, the motion vector of at least one among a neighboring block adjacent to the top-right corner of the current block, a neighboring block adjacent to the bottom-left corner, and a neighboring block adjacent to the bottom-left corner may not be set as an initial motion vector. Alternatively, when the value of merge_offset_vector_flag is 1, a temporally neighboring block of the current block may be set as being unavailable as a merge candidate.

When the merge motion difference encoding method is applied to the current block, it may be set not to use at least one among a pairwise merge candidate and a zero-merge candidate. Accordingly, when the value of merge_offset_vector_flag is 1, at least one among the pairwise merge candidate and the zero-merge candidate may not be added to the merge candidate list although the number of merge candidates included in the merge candidate list is smaller than the maximum number.

The motion vector of the merge candidate may be set as an initial motion vector of the current block. At this point, when the number of merge candidates that can be used by the current block is plural, information specifying one among the plurality of merge candidates may be signalled through a bitstream. For example, when the maximum number of merge candidates that the merge candidate list may include is greater than 1, information merge_idx indicating any one among the plurality of merge candidates may be signalled through a bitstream. That is, in the merge offset encoding method, a merge candidate may be specified by information merge_idx for specifying one among the plurality of merge candidates. The initial motion vector of the current block may be set as the motion vector of a merge candidate indicated by merge_idx.

On the other hand, when the number of merge candidates that can be used by the current block is 1, signaling of information for specifying a merge candidate may be omitted. For example, when the maximum number of merge candidates that the merge candidate list may include is not greater than 1, signaling of information merge_idx for specifying a merge candidate may be omitted. That is, in the merge offset encoding method, when one merge candidate is included in the merge candidate list, encoding of information merge_idx for determining the merge candidate may be omitted, and the initial motion vector may be determined based on the merge candidate included in the merge candidate list. The motion vector of the merge candidate may be set as the initial motion vector of the current block.

As another example, after a merge candidate of the current block is determined, whether or not to apply the merge motion difference encoding method to the current block may be determined. For example, when the maximum number of merge candidates that the merge candidate list may include is greater than 1, information merge_idx for specifying one among the merge candidates may be signalled. After a merge candidate is selected based on merge_idx, merge_offset_vector_flag indicating whether or not the merge motion difference encoding method is applied to the current block may be decoded. Table 2 is a view showing a syntax table according to the embodiment described above.

TABLE 2

| | Descriptor |
|---|---|
| coding unit (x0, y0, cbWidth, cbHeight, treeType) { | |
|   if (slice_type! = I) { | |
|     cu_skip_flag[x0][y0] | ae(v) |
|     if (cu_skip_flag[x0][y0] = = 0) | |
|       pred_mode_flag | ae(v) |
|   } | |
|   if (CuPredMode[x0][y0] = = MODE_INTRA) { | |
|     if (treeType = = SINGLE_TREE | | treeType = = DUAL_TREE_LUMA) { | |
|       intra_luma_mpm_flag[x0][y0] | |
|       if (intra_luma_mpm_flag[x0][y0] ) | |
|         intra_luma_mpm_idx[x0][y0] | ae(v) |
|       else | |
|         intra_luma_mpm_remainder[x0][y0] | ae(v) |
|     } | |
|     if (treeType = = SINGLE_TREE | | treeType = = DUAL_TREE_CHROMA) | |
|       intra_chroma_pred_mode[x0][y0] | ae(v) |
|   } else { /* MODE_INTER */ | |
|     if (cu_skip_flag[x0][y0]) { | |
|       if (merge_affine_flag[x0][y0] = = 0 && MaxNumMergeCand > 1) { | |
|         merge_idx[x0][y0] | ae(v) |
|         merge_offset_vector_flag | ae(v) |
|         if (merge_idx < 2 && merge_offset_vector_flag) | |
|         { | |
|           distance_idx[x0][y0] | ae(v) |
|           direction_idx[x0][y0] | ae(v) |
|         } | |
|       } | |
|     } else { | |
|       merge_flag[x0][y0] | ae(v) |
|       if (merge_flag[x0][y0]) { | |
|         if (merge_affine_flag[x0][y0] = = 0 && MaxNumMergeCand > 1) { | |

TABLE 2-continued

|  | Descriptor |
|---|---|
|     merge_idx[x0][y0] | ae(v) |
|     merge_offset_vector_flag | ae(v) |
|     if (merge_idx < 2 && merge_offset_vector_flag) |  |
|     { |  |
|       distance_idx[x0][y0] | ae(v) |
|       direction idx[x0][y0] | ae(v) |
|     } |  |
| } |  |
|   } else { |  |
|     if (slice_type = = B) |  |
|       inter_pred_idc[x0][y0] | ae(v) |
|     if (sps_affine_enabled_flag && cbWidth >= 16 |  |
|     && cbHeight >= 16) { |  |
|       inter_affine_flag[x0][y0] | ae(v) |
|       if (sps_affine_type_flag && |  |
|       inter_affine_flag[x0][y0] ) |  |
|         cu_affine_type_flag [x0][y0] | ae(v) |
|     } |  |
| } |  |

As another example, after a merge candidate of the current block is determined, whether or not to apply the merge motion difference encoding method to the current block may be determined only when the index of the determined merge candidate is smaller than the maximum number of merge candidates that can be used when the merge motion difference encoding method is applied. For example, only when the value of index information merge_idx is smaller than N, merge_offset_vector_flag indicating whether or not to apply the merge motion difference encoding method to the current block may be encoded and signalled. When the value of the index information merge_idx is equal to or greater than N, encoding of merge_offset_vector_flag may be omitted. When encoding of merge_offset_vector_flag is omitted, it may be determined that the merge motion difference encoding method is not applied to the current block.

Alternatively, after a merge candidate of the current block is determined, whether or not to apply the merge motion difference encoding method to the current block may be determined considering whether the determined merge candidate has bidirectional motion information or unidirectional motion information. For example, merge_offset_vector_flag indicating whether or not to apply the merge motion difference encoding method to the current block may be encoded and signalled only when the value of index information merge_idx is smaller than N and the merge candidate selected by the index information has bidirectional motion information. Alternatively, merge_offset_vector_flag indicating whether or not to apply the merge motion difference encoding method to the current block may be encoded and signalled only when the value of index information merge_idx is smaller than N and the merge candidate selected by the index information has unidirectional motion information.

Alternatively, whether or not to apply the merge motion difference encoding method may be determined based on at least one among the size of the current block, the shape of the current block, and whether the current block is in contact with the boundary of a coding tree unit. When at least one among the size of the current block, the shape of the current block, and whether the current block is in contact with the boundary of a coding tree unit does not satisfy a preset condition, encoding of merge_offset_vector_flag indicating whether or not to apply the merge motion difference encoding method to the current block may be omitted.

When a merge candidate is selected, the motion vector of the merge candidate may be set as the initial motion vector of the current block. Then, an offset vector may be determined by decoding information indicating the magnitude of the offset vector and information indicating the direction of the offset vector. The offset vector may have a horizontal direction component or a vertical direction component.

Information indicating the magnitude of the offset vector may be index information indicating any one among motion magnitude candidates. For example, index information distance_idx indicating any one among the motion magnitude candidates may be signalled through a bitstream. Table 3 shows binarization of index information distance_idx and values of variable DistFromMergeMV for determining the magnitude of an offset vector according to distance_idx.

TABLE 3

| distance_idx[x][y] | binarization | DistFromMergeMV[x0][y0] |
|---|---|---|
| 0 | 0 | 1 |
| 1 | 10 | 2 |
| 2 | 110 | 4 |
| 3 | 1110 | 8 |
| 4 | 11110 | 16 |
| 5 | 111110 | 32 |
| 6 | 1111110 | 64 |
| 7 | 1111111 | 128 |

The magnitude of an offset vector may be derived by dividing variable DistFromMergeMV by a preset value. Equation 4 shows an example of determining the magnitude of an offset vector.

$$\text{abs}(\textit{offsetMV}) = \textit{DistFromMergeMV} \ll 2 \quad \text{[Equation 4]}$$

According to Equation 4, a value obtained by dividing variable DistFromMegeMV by 4 or a value obtained by shifting variable DistFromMergeMV to the left by 2 may be set as the magnitude of an offset vector.

A larger number of motion magnitude candidates or a smaller number of motion magnitude candidates than the example shown in Table 3 may be used, or a range of motion vector offset size candidates may be set to be different from the example shown in Table 5. For example, the magnitude of the horizontal direction component or the vertical direction component of an offset vector may be set not to be greater than 2 sample distances. Table 4 shows binarization of index information distance_idx and values of variable DistFromMergeMV for determining the magnitude of an offset vector according to distance_idx.

TABLE 4

| distance_idx[x][y] | binarization | DistFromMergeMV[x0][y0] |
|---|---|---|
| 0 | 0 | 1 |
| 1 | 10 | 2 |
| 2 | 110 | 4 |
| 3 | 111 | 8 |

Alternatively, a range of motion vector offset size candidates may be set differently based on motion vector precision. For example, when the motion vector precision for the current block is a fractional-pel, values of variable DistFromMergeMV corresponding to values of index information distance_idx may be set to 1, 2, 4, 8, 16 or the like. Here, the fractional-pel includes at least one among 1/16 pel, octo-pel, quarter-pel, and half-pel. On the other hand, when the motion vector precision for the current block is an integer-pel, values of variable DistFromMergeMV corresponding to values of index information distance_idx may be set to 4, 8, 16, 32, 64, and the like. That is, a table referred to for the sake of determining variable DistFromMergeMV may be set differently according to the motion vector precision for the current block.

For example, when the motion vector precision of the current block or a merge candidate is a quarter-pel, variable DistFromMergeMV indicated by distance_idx may be derived using Table 3. On the other hand, when the motion vector precision of the current block or a merge candidate is an integer-pel, a value obtained by taking N times (e.g., 4 times) of the value of variable DistFromMergeMV indicated by distance_idx in Table 3 may be derived as a value of variable DistFromMergeMV.

Information for determining the motion vector precision may be signalled through a bitstream. For example, the information may be signalled at a sequence, picture, slice, or block level. Accordingly, the range of motion magnitude candidates may be set differently according to the information related to the motion vector precision signalled through a bitstream. Alternatively, the motion vector precision may be determined based on the merge candidate of the current block. For example, the motion vector precision of the current block may be set to be the same as the motion vector precision of the merge candidate.

Alternatively, information for determining a search range of the offset vector may be signalled through a bitstream. At least one among the number of motion magnitude candidates, a minimum numerical value among the motion magnitude candidates, and a maximum numerical value among the motion magnitude candidates may be determined based on the search range. For example, flag merge_offset_vector_flag for determining a search range of the offset vector may be signalled through a bitstream. The information may be signalled through a sequence header, a picture header, or a slice header.

For example, when the value of merge_offset_extend_range_flag is 0, the magnitude of the offset vector may be set not to exceed 2. Accordingly, the maximum numerical value of DistFromMergeMV may be set to 8. On the other hand, when the value of merge_offset_extend_range_flag is 1, the magnitude of the offset vector may be set not to exceed 32 sample distances. Accordingly, the maximum numerical value of DistFromMergeMV may be set to 128.

The magnitude of the offset vector may be determined using a flag indicating whether the magnitude of the offset vector is greater than a threshold value. For example, flag distance_flag indicating whether the magnitude of the offset vector is greater than a threshold value may be signalled through a bitstream. The threshold value may be 1, 2, 4, 8 or 16. For example, when distance_flag is 1, it indicates that the magnitude of the offset vector is greater than 4. On the other hand, when distance_flag is 0, it indicates that the magnitude of the offset vector is 4 or lower.

When the magnitude of the offset vector is greater than a threshold value, a difference value between the magnitude of the offset vector and the threshold value may be derived using index information distance_idx. Alternatively, when the magnitude of the offset vector is lower than or equal to the threshold value, the magnitude of the offset vector may be determined using index information distance_idx. Table 5 is a syntax table showing a process of encoding distance_flag and distance_idx.

TABLE 5

| | Descriptor |
|---|---|
| coding_unit (x0, y0, cbWidth, cbHeight, treeType) { | |
|   if (slice_type! = I) { | |
|     cu_skip_flag[x0][y0] | ae(v) |
|     if (cu_skip_flag[x0][y0] = = 0) | |
|       pred_mode_flag | ae(v) |
|   } | |
|   if (CuPredMode[x0][y0] = = MODE_INTRA) { | |
|     if (treeType = = SINGLE_TREE I I treeType = = DUAL_TREE_LUMA) { | |
|       intra_luma_mpm_flag[x0][y0] | |
|       if (intra_luma_mpm_flag[x0][y0] ) | |
|         intra_luma_mpm_idx[x0][y0] | ae(v) |
|       else | |
|         intra_luma_mpm_remainder[x0][y0] | ae(v) |
|     } | |
|     if (treeType = = SINGLE_TREE I I treeType = = DUAL_TREE_CHROMA) | |
|       intra_chroma_pred_mode[x0][y0] | ae(v) |
|   } else { /* MODE_INTER */ | |
|     if (cu_skip_flag[x0][y0] ) { | |
|       if (merge_affine_flag[x0][y0] = = 0 && MaxNumMergeCand > 1) { | |
|         merge_idx[x0][y0] | ae(v) |
|         merge_offset_vector_flag | ae(v) |
|         if (merge_idx < 2 && merge_offset_vector_flag) | |
|         { | |
|           distance_flag[x0][y0] | ae(v) |
|           distance_idx[x0][y0] | |
|           direction_idx[x0][y0] | ae(v) |
|         } | |
|       } | |
|     } else { | |
|       merge_flag[x0][y0] | ae(v) |
|       if (merge_flag[x0][y0] ) { | |
|         if (merge_affine_flag[ x0 ][ y0 ] = = 0 && MaxNumMergeCand > 1) { | |
|           merge_idx[x0][y0] | ae(v) |
|           merge_offset_vector_flag | ae(v) |
|           if (merge_idx < 2 && merge_offset_vector_flag) | |
|           { | |
|             distance_flag[x0][y0] | ae(v) |
|             distance_idx[x0][y0] | ae(v) |
|             direction_idx[x0][y0] | ae(v) |
|           } | |
|         } | |
|       } else { | |
|         if (slice_type = = B) | |
|           inter_pred_idc[x0][y0] | ae(v) |
|         if (sps_affine_enabled_flag && cbWidth >= 16 && cbHeight >= 16) { | |
|           inter_affine_flag[x0][y0] | ae(v) |
|           if (sps_affine_type_flag && inter_affine_flag[x0][y0] ) | |
|             cu_affine_type_flag[x0][y0] | ae(v) |
|         } | |
|       } | |
|   } | |
| } | |

Equation 5 shows an example of deriving variable DistFromMergeMV for determining a magnitude of an offset vector using distance_flag and distance_idx.

$$DistFromMergeMV = N * \text{distanc\_flag} + (1 \ll \text{distanc\_idx}) \quad \text{[Equation 5]}$$

In Equation 5, the value of distance_flag may be set to 1 or 0. The value of distance_idx may be set to 1, 2, 4, 8, 16, 32, 64, 128 or the like. N denotes a coefficient determined by a threshold value. For example, when the threshold value is 4, N may be set to 16.

Information indicating the direction of the offset vector may be index information indicating any one among vector direction candidates. For example, index information direction_idx indicating any one among the vector direction candidates may be signalled through a bitstream. Table 6 shows binarization of index information direction_idx and directions of an offset vector according to direction_idx.

TABLE 6

| direction_idx[x][y] | binarization | sign[x][y][0] | sign[x][y][1] |
|---|---|---|---|
| 0 | 00 | +1 | 0 |
| 1 | 01 | −1 | 0 |
| 2 | 10 | 0 | +1 |
| 3 | 11 | 0 | −1 |

In Table 6, sign[0] indicates the horizontal direction, and sign[1] indicates the vertical direction. +1 indicates that the value of the x component or the y component of the offset vector is plus (+), and −1 indicates that the value of the x component or the y component of the offset vector is minus (−). Equation 6 shows an example of determining an offset vector based on the magnitude and the direction of the offset vector.

$$offsetMV[0] = \text{abs}(offsetMV) * \text{sign}[0] \quad \text{[Equation 6]}$$
$$offsetMV[1] = \text{abs}(offsetMV) * \text{sign}[1]$$

In Equation 6, offsetMV[0] denotes the vertical direction component of the offset vector, and offsetMV[1] denotes the horizontal direction component of the offset vector.

Figure 17:
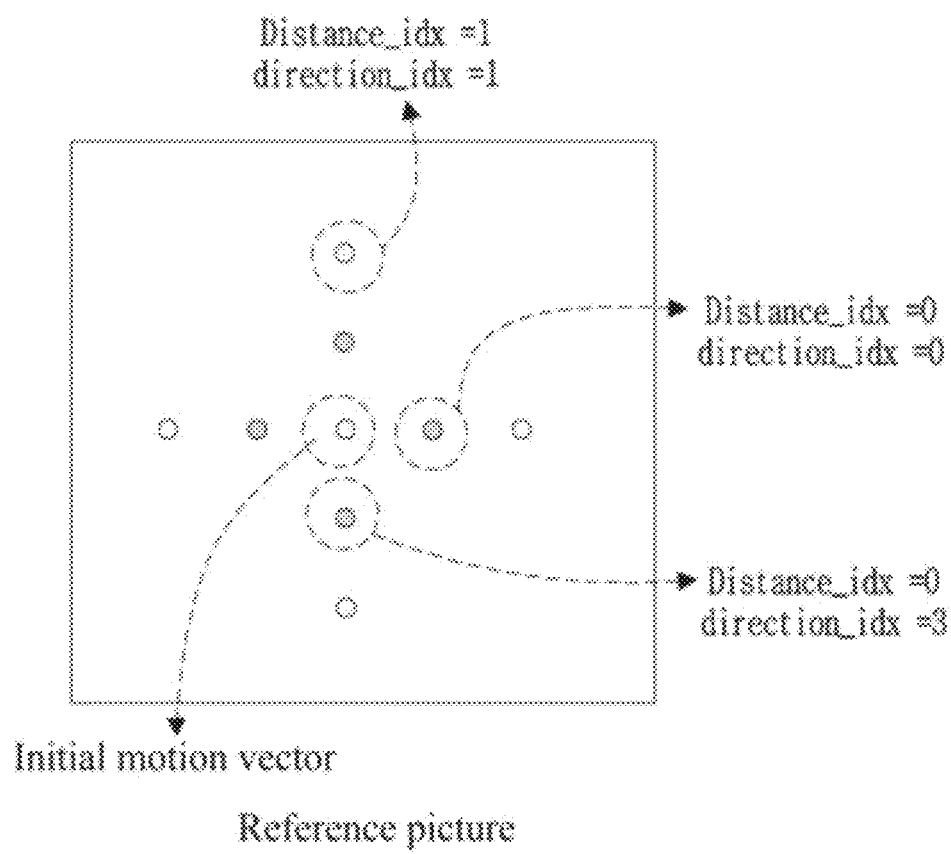
FIG. 17 is a view showing an offset vector according to values of distance_idx indicating a magnitude of an offset vector and direction_idx indicating a direction of the offset vector.

FIG. 17 is a view showing an offset vector according to values of distance_idx indicating a magnitude of an offset vector and direction_idx indicating a direction of the offset vector.

As shown in the example of FIG. 17, a magnitude and a direction of an offset vector may be determined according to values of distance_idx and direction_idx. The maximum magnitude of the offset vector may be set not to exceed a threshold value. Here, the threshold value may have a value predefined in the encoder and the decoder. For example, the threshold value may be 32 sample distances. Alternatively, the threshold value may be determined according to the magnitude of the initial motion vector. For example, the threshold value for the horizontal direction may be set based on the magnitude of the horizontal direction component of the initial motion vector, and the threshold value for the vertical direction may be set based on the magnitude of the vertical direction component of the initial motion vector.

When a merge candidate has bidirectional motion information, L0 motion vector of the merge candidate may be set as L0 initial motion vector of the current block, and L1 motion vector of the merge candidate may be set as L1 initial motion vector of the current block. At this point, L0 offset vector and L1 offset vector may be determined considering an output order difference value between L0 reference picture of the merge candidate and the current picture (hereinafter, referred to as L0 difference value) and an output order difference value between L1 reference picture of the merge candidate and the current picture (hereinafter, referred to as L1 difference value).

First, when the signs of L0 difference value and L1 difference value are the same, L0 offset vector and L1 offset vector may be set to be the same. On the other hand, when the signs of L0 difference value and L1 difference value are different, L1 offset vector may be set in a direction opposite to L0 offset vector.

The magnitude of L0 offset vector and the magnitude of L1 offset vector may be set to be the same. Alternatively, the magnitude of L1 offset vector may be determined by scaling L0 offset vector based on L0 difference value and L1 difference value.

For example, Equation 7 shows L0 offset vector and L1 offset vector when the signs of L0 difference value and L1 difference value are the same.

$$offsetMVL0[0] = \text{abs}(offsetMV) * \text{sign}[0] \quad \text{[Equation 7]}$$
$$offsetMVL0[1] = \text{abs}(offsetMV) * \text{sign}[1]$$
$$offsetMVL1[0] = \text{abs}(offsetMV) * \text{sign}[0]$$
$$offsetMVL1[1] = \text{abs}(offsetMV) * \text{sign}[1]$$

In Equation 7, offsetMVL0[0] indicates the horizontal direction component of L0 offset vector, and offsetMVL0[1] indicates the vertical direction component of L0 offset vector. offsetMVL1[0] indicates the horizontal direction component of L1 offset vector, and offsetMVL1[1] indicates the vertical direction component of L1 offset vector.

Equation 8 shows L0 offset vector and L1 offset vector when the signs of L0 difference value and L1 difference value are different.

$$offsetMVL0[0] = \text{abs}(offsetMV) * \text{sign}[0] \quad \text{[Equation 8]}$$
$$offsetMVL0[1] = \text{abs}(offsetMV) * \text{sign}[1]$$
$$offsetMVL1[0] = -1 * \text{abs}(offsetMV) * \text{sign}[0]$$
$$offsetMVL1[1] = -1 * \text{abs}(offsetMV) * \text{sign}[1]$$

More than four vector direction candidates may be defined. Tables 7 and 8 show examples in which eight vector direction candidates are defined.

TABLE 7

| direction_idx[x][y] | binarization | sign[x][y][0] | sign[x][y][1] |
|---|---|---|---|
| 0 | 000 | +1 | 0 |
| 1 | 001 | −1 | 0 |
| 2 | 010 | 0 | +1 |
| 3 | 011 | 0 | −1 |
| 4 | 100 | +1 | +1 |
| 5 | 101 | +1 | −1 |
| 6 | 110 | −1 | +1 |
| 7 | 111 | −1 | −1 |

TABLE 8

| direction_idx[x][y] | binarization | sign[x][y][0] | sign[x][y][1] |
|---|---|---|---|
| 0 | 000 | +1 | 0 |
| 1 | 001 | −1 | 0 |
| 2 | 010 | 0 | +1 |
| 3 | 011 | 0 | −1 |
| 4 | 100 | +½ | +½ |
| 5 | 101 | +½ | −½ |
| 6 | 110 | −½ | +½ |
| 7 | 111 | −½ | −½ |

In Tables 7 and 8, when absolute values of sign[0] and sign[1] are greater than 0, it indicates that the offset vector is in a diagonal direction. When Table 6 is used, the magnitudes of the x-axis and y-axis components of the diagonal offset vector are set to abs(offsetMV), whereas when Table 7 is used, the magnitudes of the x-axis and y-axis components of the diagonal offset vector are set to abs(offsetMV/2).

Figure 18:
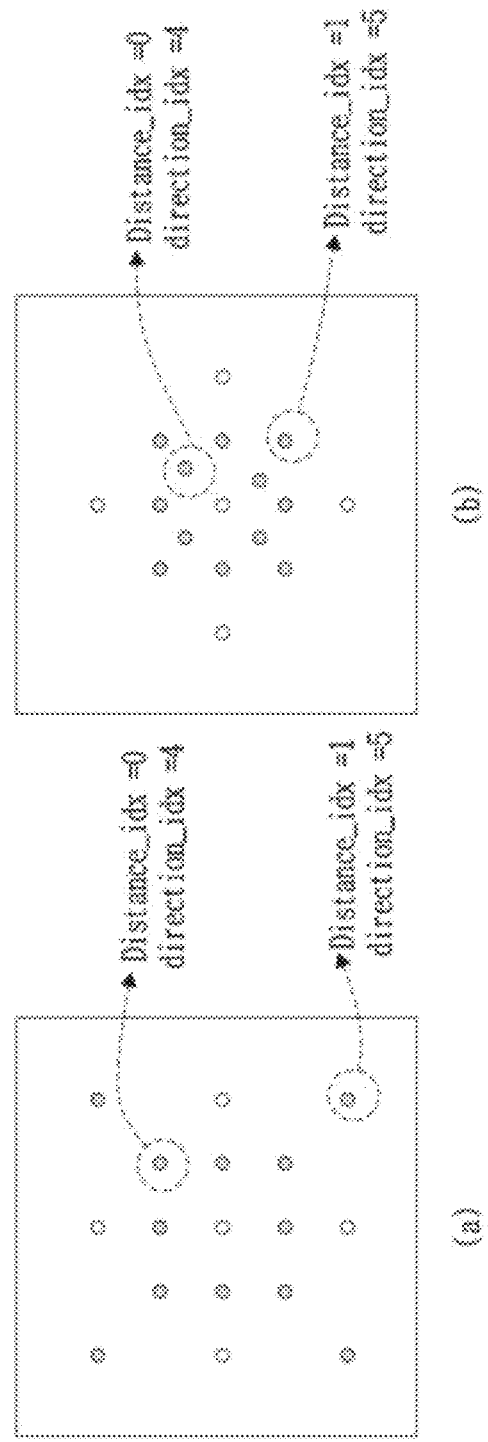
FIG. 18 is a view showing an offset vector according to values of distance_idx indicating a magnitude of an offset vector and direction_idx indicating a direction of the offset vector.

FIG. 18 is a view showing an offset vector according to values of distance_idx indicating a magnitude of an offset vector and direction_idx indicating a direction of the offset vector.

FIG. 18 (a) is a view showing an example when Table 6 is applied, and FIG. 18 (b) is a view showing an example when Table 7 is applied.

Information for determining at least one among the number and sizes of vector direction candidates may be signalled through a bitstream. For example, flag merge_offset_direction_range_flag for determining vector direction candidates may be signalled through a bitstream. The flag may be signalled at a sequence, picture, or slice level. For example, when the numerical value of the flag is 0, four vector direction candidates exemplified in Table 6 may be used. On the other hand, when the numerical value of the flag is 1, eight vector direction candidates exemplified in Table 7 or Table 8 may be used.

Alternatively, at least one among the number and sizes of vector direction candidates may be determined based on the magnitude of the offset vector. For example, when the value of variable DistFromMergeMV for determining the magnitude of the offset vector is equal to or smaller than a threshold value, eight vector direction candidates exemplified in Table 7 or Table 8 may be used. On the other hand, when the value of variable DistFromMergeMV is greater than the threshold value, four vector direction candidates exemplified in Table 6 may be used.

Alternatively, at least one among the number and sizes of vector direction candidates may be determined based on value MVx of the x component and value MVy of the y component of the initial motion vector. For example, when the difference between MVx and MVy or the absolute value of the difference is smaller than or equal to a threshold value, eight vector direction candidates exemplified in Table 7 or Table 8 may be used. On the other hand, when the difference between MVx and MVy or the absolute value of the difference is greater than the threshold value, four vector direction candidates exemplified in Table 6 may be used.

The motion vector of the current block may be derived by adding an offset vector to the initial motion vector. Equation 9 shows an example of determining a motion vector of the current block.

$$mvL0[0] = mergeMVL0[0] + offsetMVL0[0]$$
$$mvL0[1] = mergeMVL0[1] + offsetMVL0[1]$$
$$mvL1[0] = mergeMVL1[0] + offsetMVL1[0]$$
$$mvL1[1] = mergeMVL1[1] + offsetMVL1[1]$$

[Equation 9]

In Equation 9, mvL0 denotes L0 motion vector of the current block, and mvL1 denotes L1 motion vector of the current block. mergeMVL0 denotes L0 initial motion vector of the current block (i.e., L0 motion vector of a merge candidate), and mergeMVL1 denotes L1 initial motion vector of the current block. [0] indicates the horizontal direction component of the motion vector, and [1] indicates the vertical direction component of the motion vector.

Intra prediction is for predicting a current block using reconstructed samples that have been encoded/decoded in the neighborhood of the current block. At this point, samples reconstructed before an in-loop filter is applied may be used for intra prediction of the current block.

The intra prediction technique includes matrix-based intra prediction, and general intra prediction considering directionality with respect to neighboring reconstructed samples. Information indicating the intra prediction technique of the current block may be signalled through a bitstream. The information may be a 1-bit flag. Alternatively, the intra prediction technique of the current block may be determined based on at least one among the location, the size, and the shape of the current block, or based on an intra prediction technique of a neighboring block. For example, when the current block exists across a picture boundary, it may be set not to apply the matrix-based intra prediction intra prediction to the current block.

The matrix-based intra prediction intra prediction is a method of acquiring a prediction block of the current block by an encoder and a decoder based on a matrix product between a previously stored matrix and reconstructed samples in the neighborhood of the current block. Information for specifying one among a plurality of previously stored matrixes may be signalled through a bitstream. The decoder may determine a matrix for intra prediction of the current block based on the information and the size of the current block.

The general intra prediction is a method of acquiring a prediction block for the current block based on a non-angular intra prediction mode or an angular intra prediction mode.

A derived residual picture may be derived by subtracting a prediction video from an original video. At this point, when the residual video is changed to the frequency domain, subjective video quality of the video is not significantly lowered although the high-frequency components among the frequency components are removed. Accordingly, when values of the high-frequency components are converted to be small or the values of the high-frequency components are set to 0, there is an effect of increasing the compression efficiency without generating significant visual distortion. By reflecting this characteristic, the current block may be transformed to decompose a residual video into two-dimensional frequency components. The transform may be performed using a transform technique such as Discrete Cosine Transform (DCT) or Discrete Sine Transform (DST).

After the current block is transformed using DCT or DST, the transformed current block may be transformed again. At this point, the transform based on DCT or DST may be defined as a first transform, and transforming again a block to which the first transform is applied may be defined as a second transform.

The first transform may be performed using any one among a plurality of transform core candidates. For example, the first transform may be performed using any one among DCT2, DCT8, or DCT7.

Different transform cores may be used for the horizontal direction and the vertical direction. Information indicating combination of a transform core of the horizontal direction and a transform core of the vertical direction may be signalled through a bitstream.

Units for performing the first transform and the second transform may be different. For example, the first transform may be performed on an 8×8 block, and the second transform may be performed on a subblock of a 4×4 size among the transformed 8×8 block. At this point, the transform coefficients of the residual regions that has not been performed the second transform may be set to 0.

Alternatively, the first transform may be performed on a 4×4 block, and the second transform may be performed on a region of an 8×8 size including the transformed 4×4 block.

Information indicating whether or not the second transform has been performed may be signalled through a bitstream.

The decoder may perform an inverse transform of the second transform (a second inverse transform), and may perform an inverse transform of the first transform (a first inverse transform) on a result of the inverse transform. As a result of performing the second inverse transform and the first inverse transform, residual signals for the current block may be acquired.

Quantization is for reducing the energy of a block, and the quantization process includes a process of dividing a transform coefficient by a specific constant value. The constant value may be derived by a quantization parameter, and the quantization parameter may be defined as a value between 1 and 63.

When the encoder performs transform and quantization, the decoder may acquire a residual block through inverse quantization and inverse transform. The decoder may acquire a reconstructed block for the current block by adding a prediction block and the residual block.

When a reconstructed block of the current block is acquired, loss of information occurring in the quantization and encoding process may be reduced through in-loop filtering. An in-loop filter may include at least one among a deblocking filter, a sample adaptive offset filter (SAO), and an adaptive loop filter (ALF).

Applying the embodiments described above focusing on a decoding process or an encoding process to an encoding process or a decoding process is included in the scope of the present disclosure. Changing the embodiments described in a predetermined order in an order different from the described order is also included in the scope of the present disclosure.

Although the embodiments above have been described based on a series of steps or flowcharts, this does not limit the time series order of the present disclosure, and may be performed simultaneously or in a different order as needed. In addition, each of the components (e.g., units, modules, etc.) constituting the block diagram in the embodiments described above may be implemented as a hardware device or software, or a plurality of components may be combined to be implemented as a single hardware device or software. The embodiments described above may be implemented in the form of program commands that can be executed through various computer components and recorded in a computer-readable recording medium. The computer-readable recording medium may include program commands, data files, data structures and the like independently or in combination. The computer-readable recording medium includes, for example, magnetic media such as a hard disk, a floppy disk and a magnetic tape, optical recording media such as a CD-ROM and a DVD, magneto-optical media such as a floptical disk, and hardware devices specially configured to store and execute program commands, such as a ROM, a RAM, a flash memory and the like. The hardware devices described above can be configured to operate using one or more software modules to perform the process of the present disclosure, and vice versa.

The present disclosure can be applied to an electronic device that encodes and decodes a video.

What is claimed is:

1. A video decoding method comprising the steps of:
generating a merge candidate list for a current block;
determining a merge candidate for the current block among merge candidates included in the merge candidate list;
deriving an offset vector for the current block,
wherein a magnitude of the offset vector is determined based on first index information specifying one among motion magnitude candidates,
wherein the magnitude of the offset vector is obtained by applying an arithmetic left shift operation by two binary digits to a value indicated by the motion magnitude candidate specified by the first index information; and
deriving a motion vector for the current block by adding the offset vector to a motion vector of the merge candidate;
wherein at least one among a maximum numerical value and a minimum numerical value of the motion magnitude candidates is set differently according to a numerical value of a flag indicating a numerical range of the motion magnitude candidates, and
the flag is signalled at a picture level.

2. The method according to claim 1, wherein at least one among a maximum numerical value and a minimum numerical value of the motion magnitude candidates is set differently according to motion vector precision for the current block.

3. The method according to claim 1, wherein a direction of the offset vector is determined based on second index information specifying one among vector direction candidates.

4. The method according to claim 2, wherein a range of motion vector offset size candidates is set differently based on the motion vector precision.

5. The method according to claim 2, wherein the motion vector precision for the current block is a fractional-pel, wherein a numerical value of a variable corresponding to index information is set to 1, 2, 4, 8, or 16.

6. The method according to claim 5, wherein the fractional-pel includes quarter-pel.

7. The method according to claim 2, wherein the motion vector precision for the current block is an integer-pel, wherein a numerical value of a variable corresponding to index information is set to 4, 8, 16, 32, or 64.

8. The method according to claim 2, wherein information for determining the motion vector precision is signaled at a picture level of a bitstream.

9. A video encoding method comprising the steps of:
generating a merge candidate list for a current block;
selecting a merge candidate for the current block among merge candidates included in the merge candidate list;
deriving an offset vector for the current block;
encoding first index information for specifying a motion magnitude candidate indicating a magnitude of the offset vector among a plurality of motion magnitude candidates,
wherein the motion magnitude candidate has a value derived by applying an arithmetic left shift operation by two binary digits to the magnitude of the offset vector; and
deriving a motion vector for the current block by adding the offset vector to a motion vector of the merge candidate;
wherein the method further comprises the step of encoding a flag indicating a numerical range of the motion magnitude candidates, wherein at least one among a maximum numerical value and a minimum numerical value of the motion magnitude candidates is set differently according to a numerical value of the flag, and the flag is encoded at a picture level.

10. The method according to claim 9, wherein at least one among a maximum numerical value and a minimum numerical value of the motion magnitude candidates is set differently according to motion vector precision for the current block.

11. The method according to claim 9, further comprising the step of encoding second index information for specifying a vector direction candidate indicating a direction of the offset vector among a plurality of vector direction candidates.

12. The method according to claim 10, wherein a range of motion vector offset size candidates is set differently based on the motion vector precision.

13. The method according to claim 10, wherein the motion vector precision for the current block is a fractional-pel, wherein a numerical value of a variable corresponding to index information is set to 1, 2, 4, 8, or 16.

14. The method according to claim 13, wherein the fractional-pel includes quarter-pel.

15. The method according to claim 10, wherein the motion vector precision for the current block is an integer-pel, wherein a numerical value of a variable corresponding to index information is set to 4, 8, 16, 32, or 64.

16. A video decoding device, comprising:
a memory module storing instructions;
a processing unit configured to, upon executing the instructions: generate a merge candidate list for a current block, determine a merge candidate for the current block among merge candidates included in the merge candidate list, derive an offset vector for the current block, wherein a magnitude of the offset vector is determined based on first index information specifying one among motion magnitude candidates, wherein the magnitude of the offset vector is obtained by applying an arithmetic left shift operation by two binary digits to a value indicated by the motion magnitude candidate specified by the first index information, and derive a motion vector for the current block by adding the offset vector to a motion vector of the merge candidate;

wherein at least one among a maximum numerical value and a minimum numerical value of the motion magnitude candidates is set differently according to a numerical value of a flag indicating a numerical range of the motion magnitude candidates, and the flag is signalled at a picture level.

17. The device according to claim 16, wherein at least one among a maximum numerical value and a minimum numerical value of the motion magnitude candidates is set differently according to motion vector precision for the current block.

18. The device according to claim 16, wherein a direction of the offset vector is determined based on second index information specifying one among vector direction candidates.

19. The device according to claim 17, wherein a range of motion vector offset size candidates is set differently based on the motion vector precision.

20. The device according to claim 17, wherein the motion vector precision for the current block is a fractional-pel, wherein a numerical value of a variable corresponding to index information is set to 1, 2, 4, 8, or 16.

* * * * *